United States Patent [19]

Negishi et al.

[11] Patent Number: 5,627,661

[45] Date of Patent: May 6, 1997

[54] FACSIMILE APPARATUS FOR OPTICALLY RECOGNIZING CHARACTERS AND TRANSMITTING THE RECOGNIZED CHARACTERS AND COMMUNICATION SYSTEM FOR TRANSMITTING THE RECOGNIZED CHARACTERS BETWEEN A TERMINAL AND A CENTER

[75] Inventors: Ryuichi Negishi, Kawasaki; Kiyonori Sekiguchi, Tokyo; Koichi Nagoshi; Hiroshi Saza, both of Yokohama; Kiyohiko Honda, Tokyo; Tsuyoshi Nishijima, Tokyo; Kazunori Sato, Tokyo, all of Japan

[73] Assignee: Matsushita Graphic Communication Systems, Inc., Tokyo, Japan

[21] Appl. No.: 414,662

[22] Filed: Mar. 31, 1995

[30] Foreign Application Priority Data

Nov. 8, 1994 [JP] Japan ..................... 6-273575

[51] Int. Cl.$^6$ ..................... H04N 1/00
[52] U.S. Cl. ..................... 358/470; 358/403
[58] Field of Search ..................... 358/470, 403, 358/400, 405; 382/179, 182, 187, 189, 229

[56] References Cited

U.S. PATENT DOCUMENTS

| 4,352,012 | 9/1982 | Verderber et al. | 358/403 |
| 5,274,468 | 12/1993 | Ojha | 358/470 |
| 5,363,214 | 11/1994 | Johnson | 358/470 |
| 5,438,426 | 8/1995 | Miake et al. | 358/403 |
| 5,465,167 | 11/1995 | Cooper et al. | 358/403 |
| 5,479,269 | 12/1995 | Bronnenberg et al. | 358/403 |

*Primary Examiner*—Stephen Brinich
*Attorney, Agent, or Firm*—Lowe, Price, LeBlanc & Becker

[57] ABSTRACT

An OCR document sheet is printed at an order terminal side, and contents of an order written in the OCR document sheet by an transmitter are read by a scanner of a scanner control element at the order terminal side. The contents of the order are converted into pieces of character recognized data according to the optical character recognition. Also, character patterns such as "commodity name" are generated in a character generating element. The character recognized data and the character patterns are displayed, and the character recognized data are corrected when a transmitter desires the correction of the data displayed. Thereafter, the character recognized data are transmitted to an order-receiving center to inform the center of the contents of the order. Also, the character recognized data and the character patterns are printed out to record the contents of the order at the order terminal side. Because the character patterns are displayed with the character recognized data, the transmitter can easily realize the meaning of the character recognized data.

28 Claims, 25 Drawing Sheets

FIG. 5

OCR SHEET FORMAT INFORMATION
(INCLUDING FORMAT RECOGNITION INFORMATION)

| | |
|---|---|
| 41 | INPUT IMAGE TOP ADDRESS |
| 42 | INPUT IMAGE LATERAL WIDTH |
| 43 | RESOLUTION |
| 44 | REJECT COEFFICIENT |
| 45 | INCLINATION DETECTING MARK RANGE |
| 46 | FORMAT RECOGNIZING OMR TABLE |
| 47 | THE NUMBER OF MARKS |
| 48 | TOP MARK X COORDINATE |
| 49 | MARK WIDTH |
| 50 | MARK HEIGHT |
| 51 | X COORDINATE INTERVAL VALUE |
| 52 | THE NUMBER OF LINES |
| 53 | TIMING MARK DETECTING X COORDINATE |
| 54 | TIMING MARK DETECTING Y COORDINATE |
| 55 | TIMING MARK DETECTING WIDTH |
| 56 | TIMING MARK DETECTING HEIGHT |
| 57 | THE NUMBER OF BLOCKS IN A LINE |
| 58 | THE NUMBER OF MARKS |
| 59 | MARK WIDTH |
| 60 | MARK HEIGHT |
| 61 | X COORDINATE INTERVAL VALUE |
| 62 | THE NUMBER OF CHARACTERS |
| 63 | TAKING-OUT X COORDINATE RANGE OF A FIRST CHARACTER |
| 64 | TAKING-OUT WIDTH OF A CHARACTER |
| 65 | TAKING-OUT HEIGHT OF A CHARACTER |
| 66 | DOCUMENT SHEET PREPARATION ADDING INFORMATION |
| 67 | TIMING MARK INTERVAL DISTANCE |
| 68 | $(X_1, Y_1), (X_2, Y_2), \cdots, (X_n, Y_n)$ |
| 69 | END |

FIG. 6

FORMAT NUMBER

─── 71

| STORE CODE | NUMBER | |
|---|---|---|
| 72 | | 74 |
| 1 2 3 4 | 0 0 1 2 | K. Sekiguchi |
| COMMODITY CODE | THE NUMBER OF ORDERED COMMODITIES | THE NUMBER OF RETURNED COMMODITIES |
| 0 0 1 ─73 | 1 1 1 | 2 2 3 |
| 0 0 2 | 0 1 0 | 0 1 0 |
| 0 0 3 | 0 2 0 | 0 2 3 |
| 0 1 0 | 0 3 0 | 0 0 5 |
| 0 1 1 | 0 4 0 | 0 0 7 |
| 0 2 2 | 0 5 0 | 0 0 1 |
| 0 2 3 | 0 0 1 | 0 0 0 |

FIG. 7

| 81 | THE NUMBER OF IMAGE PLANES | N | | | | |
|---|---|---|---|---|---|---|
| 82 | FIXED IMAGE PLANE CHARACTER DATA | A STRAIN OF CHARACTERS 0 | THE NUMBER OF CHARACTERS DISPLAY STARTING POSITION (X, Y) OF A FIRST CHARACTER | | | |
| | | A STRAIN OF CHARACTERS 1 | THE NUMBER OF CHARACTERS DISPLAY STARTING POSITION (X, Y) OF A FIRST CHARACTER | | | |
| | | ~~ | | | | |
| | | A STRAIN OF CHARACTERS n | THE NUMBER OF CHARACTERS DISPLAY STARTING POSITION (X, Y) OF A FIRST CHARACTER | | | |
| 83 | CHARACTER RECOGNITION BLOCK DATA | A STRAIN OF RECOGNITION BLOCKS 0 | THE NUMBER OF BLOCKS DISPLAY STARTING POSITION (X, Y) OF A FIRST BLOCK | | | |
| | | A STRAIN OF RECOGNITION BLOCKS 1 | | | | |
| | | ~~ | | | | |
| | | A STRAIN OF RECOGNITION BLOCKS n | | | | |
| 84 | CODE CONVERSION TABLE FOR CONVERTING CHARACTER RECOGNIZED DATA | 85 TABLE FOR STORE NAMES | 0 0 0 1 | A-STORE | | 1 |
| | | | ~~ | | | |
| | | | 1 2 3 4 | Z-STORE | | 12 |
| | | 86 TABLE FOR COMMODITY NAMES | 0 0 1 | A-MAGAZINE | | |
| | | | 0 0 2 | B-MAGAZINE | | |
| | | | 0 0 3 | C-MAGAZINE | | |
| | | | ~~ | | | |
| | | | 0 1 0 | J-MAGAZINE | | |
| | | | 0 1 1 | K-MAGAZINE | | |
| | | | ~~ | | | |
| | | | 0 2 2 | V-MAGAZINE | | |
| | | | 0 2 3 | W-MAGAZINE | | |

FIG. 8

⟨OCR SYSTEM⟩

ORDERING OR RETURNING SLIP  82

STORE NAME  1234  85

| NO. | COMMODITY NAMES | COMMODITY CODES | THE NUMBER OF ORDERED COMMODITIES | THE NUMBER OF RETURNED COMMODITIES |
|---|---|---|---|---|
| 1 | A-MAGAZINE | 001 | 111 | 223 |
| 2 | B-MAGAZINE | 002 | 010 | 010 |
| 3 | C-MAGAZINE | 003 | 020 | 003 |
| 4 | J-MAGAZINE | 010 | 030 | 005 |
| 5 | K-MAGAZINE | 011 | 040 | 007 |
| 6 | V-MAGAZINE  86 | 022 | 050 | 001 |
| 7 | W-MAGAZINE | 023 | 001 | 000 |

FIG. 12

⟨OCR SYSTEM⟩

TO OCR CENTER
DATE : JAN. 1, 1993
TIME : 10:30
TRANSMITTER : ID 9712

STORE NAME : 1234
ORDERING OR RETURNING SLIP

| NO. | COMMODITY NAMES | COMMODITY CODES | THE NUMBER OF ORDERED COMMODITIES | THE NUMBER OF RETURNED COMMODITIES |
|-----|-----------------|-----------------|-----------------------------------|------------------------------------|
| 1 | A-MAGAZINE | 001 | 111 | 223 |
| 2 | B-MAGAZINE | 002 | 010 | 010 |
| 3 | C-MAGAZINE | 003 | 020 | 003 |
| 4 | J-MAGAZINE | 010 | 030 | 005 |
| 5 | K-MAGAZINE | 011 | 040 | 007 |
| 6 | V-MAGAZINE | 022 | 050 | 001 |
| 7 | W-MAGAZINE | 023 | 001 | 000 |

ORDERING PERSON

K. Sekiguchi

··· THE ABOVE ORDER IS TRANSMITTED TO OCR CENTER ···

```
                                TO Z-STORE
                                DATE : JAN, 1, 1993,   TIME : 10:30
        〈OCR SYSTEM〉
                                ORDERING OR RETURNING SLIP
                                STORE NAME : 1234

COMMODITY  COMMODITY  THE NUMBER OF        THE NUMBER OF
     NO. NAMES      CODES      ORDERED COMMODITIES  RETURNED COMMODITIES

1   A-MAGAZINE    001         111                  223
     2   B-MAGAZINE    002         010                  010
     3   C-MAGAZINE    003         020                  003
     4   J-MAGAZINE    010         030                  005
     5   K-MAGAZINE    011         040                  007
     6   V-MAGAZINE    022         050                  001
     7   W-MAGAZINE    023         001                  000

ORDERING PERSON
                                            K. Sekiguchi
     ··· THE ABOVE ORDER IS RECEIVED ···
```

FIG. 19

⟨ORDER SHEET⟩

ORDER CODE [1][2][3][5][6]

ORDER DATE [1][0] MONTH [2][5] DAY

COMMODITY CODES    NUMBER OR QUANTITY

CHARACTER RECOGNITION SYSTEM    1/1 PAGE

⟨ORDER SHEET⟩

ORDER CODE    [12356] M ELECTRONIC COMPANY MEGURO

ORDER DATE    OCTOBER [25]

| COMMODITY CODES | COMMODITY NAMES | THE NUMBER OF ORDERED COMMODITIES |
|---|---|---|
| [0101] | TELEVISION | [ 5] |
| [0102] | RADIO | [ 9] |
| [1201] | BATTERY | [53] |
| [1202] | ELECTRONIC OVEN | [27] |
| [2801] | STEREO | [14] |

[TRANSMISSION] [NEXT IMAGE] [PRINT] [END]

FIG. 21A

| CODE CONVERSION TABLE (NO. 1) | NO. | ORDER CODES | STRAINS OF CHARACTERS |
|---|---|---|---|
| NAME OF CODE CONVERSION TABLE : ORDER CODE | 1 | 0 0 0 0 1 | S COMMERCIAL COMPANY SHINAGAWA |
| | 2 | 0 0 0 0 2 | S COMMERCIAL COMPANY SHINJUKU |
| | 3 | 1 0 0 0 1 | Y ELECTRONIC COMPANY TECHNICAL SECTION |
| | 4 | 1 0 0 0 2 | Y ELECTRONIC COMPANY BUSINESS SECTION |
| | ~ | ~ | ~ |
| | n | 1 2 3 5 6 | M ELECTRONIC COMPANY MEGURO |

FIG. 21B

| CODE CONVERSION TABLE (NO. 2) | NO. | COMMODITY CODES | STRAINS OF CHARACTERS |
|---|---|---|---|
| NAME OF CODE CONVERSION TABLE : COMMODITY CODE | 1 | 0 1 0 1 | TELEVISION |
| | 2 | 0 1 0 2 | RADIO |
| | 3 | 1 2 0 1 | BATTERY |
| | 4 | 1 2 0 2 | ELECTRONIC OVEN |
| | ~ | ~ | ~ |
| | n | 2 8 0 1 | STEREO |

FIG. 22

| | | |
|---|---|---|
| LCD DISPLAY FORMAT STRAINS OF FIXED CHARACTERS | A STRAIN OF FIXED CHARACTERS 1 | DISPLAY STARTING POSITION (X, Y) OF ASTRAIN OF FIXED CHARACTERS |
| | | DISPLAYED DATA TYPE DISTINGUISHING CODE (CHARACTER RECOGNIZED DATA/ RETURNED DATA) |
| | | OFFSET OF A STRAIN OF FIXED CHARACTERS |
| | A STRAIN OF FIXED CHARACTERS 2 | DISPLAY STARTING POSITION (X, Y) |
| | | DISPLAYED DATA TYPE DINTINGUISHING CODE |
| | | OFFSET |
| | ≀ | ≀ |
| | A STRAIN OF FIXED CHARACTERS n | |
| LCD DISPLAY FORMAT CHARACTER RECOGNIZED DATA RETURNED DATA | A STRAIN OF DATA 1 | DISPLAY STARTING POSITION (X, Y) |
| | | IDENTIFYING SYMBOL |
| | | DISPLAYED DATA TYPE DISTINGUISHING CODE |
| | | OFFSET |
| | | CONVERSION INFORMATION : NO EXISTENCE OF CONVERTED DATA |
| | A STRAIN OF DATA 2 | DISPLAY STARTING POSITION (X, Y) |
| | | IDENTIFYING SYMBOL |
| | | DISPLAYED DATA TYPE DISTINGUSHING CODE |
| | | OFFSET |
| | | CONVERSION INFORMATION : EXISTENCE OF CONVERTED DATA |
| | | SPECIFYING INFORMATION |
| | | DISPLAY STARTING POSITION (X, Y) |
| | ≀ | ≀ |
| | A STRAIN OF DATA n | |

FIG. 26

RETURNED DATA LCD DISPLAY (FIRST IMAGE)

```
┌─────────────────────────────────────────────────────────────┐
│ ┌CHARACTER RECOGNITION SYSTEM┐  〈FIRST IMAGE OF RETURNED DATA〉 │
│                                                             │
│ 〈ORDER SHEET〉                                              │
│ ORDER CODE   [12356] M ELECTRONIC COMPANY, MEGURO           │
│ ORDER DATE   OCTOBER [25]                                   │
│                                                             │
│                                          THE NUMBER OF      │
│ COMMODITY CODES    COMMODITY NAMES    ORDERED COMMODITIES   │
│                                                             │
│     [0101]         TELEVISION              [ 5]             │
│     [0102]         RADIO                   [ 9]             │
│     [1201]         BATTERY                 [53]             │
│     [1202]         ELECTRONIC OVEN         [27]             │
│     [2801]         STEREO                  [14]             │
│                                                             │
│              ┌NEXT ┐ ┌PRINT┐         ┌ END ┐                │
│              │IMAGE│ └─────┘         └─────┘                │
│              └─────┘                                        │
└─────────────────────────────────────────────────────────────┘
```

RETURNED DATA LCD DISPLAY (SECOND IMAGE)

```
┌─────────────────────────────────────────────────────────────┐
│ ┌CHARACTER RECOGNITION SYSTEM┐  〈SECOND IMAGE OF RETURNED DATA〉│
│                                                             │
│   TOTAL NUMBERS OF ORDERED COMMODITIES   108                │
│   THE AMOUNT OF MONEY                    ¥568,350           │
│   DELIVERED DATE                         NOVEMBER 3         │
│                                                             │
│   RECEIVED NUMBER      931025003                            │
│                                                             │
│              ┌NEXT ┐ ┌PRINT┐         ┌ END ┐                │
│              │IMAGE│ └─────┘         └─────┘                │
│              └─────┘                                        │
└─────────────────────────────────────────────────────────────┘
```

FIG. 27

```
                        ORDER SHEET

ORDER CODE    [12356] M ELECTRONIC COMPANY, MEGURO
ORDER DATE    OCTOBER [25]
                                        THE NUMBER OF
COMMODITY CODES    COMMODITY NAMES      ORDERED COMMODITIES
─────────────────────────────────────────────────────────────
    [0101]         TELEVISION              [ 5]
    [0102]         RADIO                   [ 9]
    [1201]         BATTERY                 [53]
    [1202]         ELECTRONIC OVEN         [27]
    [2801]         STEREO                  [14]
─────────────────────────────────────────────────────────────

RETURNED DATA (PRINT)

ORDER SHEET

ORDER CODE    [12356] M ELECTRONIC COMPANY, MEGURO
ORDER DATE    OCTOBER [25]
                                        THE NUMBER OF
COMMODITY CODES    COMMODITY NAMES      ORDERED COMMODITIES
─────────────────────────────────────────────────────────────
    [0101]         TELEVISION              [ 5]
    [0102]         RADIO                   [ 9]
    [1201]         BATTERY                 [53]
    [1202]         ELECTRONIC OVEN         [27]
    [2801]         STEREO                  [14]
─────────────────────────────────────────────────────────────
    TOTAL NUMBERS OF ORDERED COMMODITIES   108
    THE AMOUNT OF MONEY                    ¥568,350
    DELIVERED DATE                         NOVEMBER 3

RECEIVED NUMBER      931025003
```

FACSIMILE APPARATUS FOR OPTICALLY RECOGNIZING CHARACTERS AND TRANSMITTING THE RECOGNIZED CHARACTERS AND COMMUNICATION SYSTEM FOR TRANSMITTING THE RECOGNIZED CHARACTERS BETWEEN A TERMINAL AND A CENTER

BACKGROUND OF THE INVENTION

1. Field of the Invention

The present invention relates generally to a facsimile apparatus in which entry information of an optical character recognition (OCR) sheet is recognized in a terminal place and recognized results are transmitted to an order-receiving center, and more particularly to a facsimile apparatus in which entry information of a plurality of OCR sheets are recognized or the recognized results are displayed or printed. Also, the present invention relates generally to a communication system in which entry information of an OCR sheet is recognized in a terminal place, recognized results are transmitted to an order-receiving center, and an order process is performed. In particular, the present invention relates to a communication system in which the OCR sheet is printed out.

2. Description of the Prior Art

2.1. Previously Proposed Art

Contents of an order is given to an order-receiving center by phone, or a handwritten document is transmitted from an order terminal side to the order-receiving center according to a facsimile communication after the contents are handwritten. In the center, the contents of the order are manually input to a host computer through a keyboard by an operator. However, the input processing is troublesome, and an input error often occurs. Therefore, in an advanced prior art, piece of image data transmitted by facsimile are automatically converted into pieces of code data according to a character recognition processing, and the code data are input to the host computer without using the keyboard.

In detail, names of one or more ordered articles or one or more codes corresponding to the ordered articles are written in an OCR sheet, and the number of ordered articles is also written in the OCR sheet in numeral for each type of article. Thereafter, pieces of order data written in the OCR sheet is transmitted to the order-receiving center according to the facsimile communication. In the center, the order data of the OCR sheet are received as pieces of image data, and the image data are recognized with a character recognition apparatus to convert the image data into pieces of code data, and the code data are input to the host computer.

In a current art, the image data are not recognized with the character recognition apparatus with an accuracy of 100%. In other words, there is a possibility that the image data are erroneously recognized, so that the code data in which one or more data erroneously recognized are included at some possibility are input to the host computer. In the host computer, the code data including the erroneous data at some possibility are converted into pieces of reproduced image data indicating pieces of reproduced order data, and the reproduced image data are transmitted to the order terminal side according to the facsimile communication. Thereafter, the reproduced image data are checked at the order terminal side. In case where one or more pieces of erroneous data are found in the reproduced image data, the order terminal side requests the order-receiving center to correct the erroneous data. Thereafter, at the order-receiving center, pieces of corrected code data are manually input to the host computer through the keyboard or are manually written in a correcting input sheet to input the corrected code data in the host computer.

2.2. Problems to be Solved by the Invention

However, there is a drawback that the work for checking the reproduced image data at the order terminal side and manually inputting or writing the corrected code data at the order-receiving center is troublesome.

To solve the drawback, one or more order items are written in an OCR document sheet at the order terminal side, a character recognition of the order items are performed with a character recognition apparatus at the order terminal side to convert the order items into pieces of image data, an operator corrects one or more errors in cases where he finds out the errors from the image data, and the image data corrected are transmitted to the order-receiving center.

In this case, it is necessary that the operator checks whether or not one or more errors exist in the image data to prevent the image data including the errors from being transmitted to the order-receiving center. In a conventional checking device, the image data of the order items written in an OCR document sheet are limitedly displayed. Therefore, there is another drawback that it is difficult for the operator to realize what the image data displayed by the conventional checking device indicate.

Also, a format of the OCR document sheet is often modified according to the variation of the orders for the purpose of being easily used or because of the modification of intended purposes. In this case, various types of OCR document sheets are actually utilized to process many types of orders. Therefore, it is required for each of the order terminal sides to provide with the basic processing program used for performing the character recognition for the types of OCR document sheets and pieces of OCR sheet format information used for respectively detecting one or more character regions of one type of OCR document sheet in which the order items are handwritten.

Also, in this case, it is required to store not only a plurality of basic processing program but also pieces of OCR sheet format information in a memory of each order terminal side, there is another drawback that it is required to provide a memory having a large capacity for each of the order terminal sides. Also, it is required that the OCR sheet format information are modified for each of the order terminal sides. Therefore, it is impossible to modify the OCR sheet format information required in the order terminal sides without any error.

SUMMARY OF THE INVENTION

A first object of the present invention is to provide, with due consideration to the first drawback of such a conventional facsimile apparatus and a conventional communication system, a facsimile apparatus and a communication system in which pieces of order data is transmitted from the order terminal side to the order-receiving center on condition that an erroneous recognition of the order data at the order-receiving center is considerably reduced.

A second object of the present invention is to provide a facsimile apparatus in which the meaning of pieces of character recognized data of the order items can be easily confirmed by an ordering person or company (or a transmitter) when the character recognized data obtained according to the character recognition at the order terminal side are displayed or output.

The first object is achieved by the provision of a facsimile apparatus comprising:

format information storing means for storing a piece of display format information;

program storing means for storing an OCR document sheet recognizing program and a piece of OCR sheet specifying information, the OCR document sheet recognizing program being utilized to recognize a piece of image data as a character, and the OCR sheet specifying information being utilized to specify a type of the OCR document sheet;

reading means for reading contents of an order written in an OCR document sheet and obtaining pieces of image data from the contents of the order;

character recognizing means for recognizing the image data obtained in the reading means according to the OCR document sheet recognizing program and the OCR sheet specifying information stored in the program storing means to convert the image data into pieces of character recognized data;

character pattern generating means for generating a character pattern which supports the realization of the character recognized data obtained in the character recognizing means;

displaying means for displaying the character recognized data obtained in the character recognizing means and the character pattern generated by the character pattern generating means according to the display format information stored in the format information storing means; and data transmitting means for transmitting the character recognized data obtained in the character recognizing means to an order-receiving center.

The facsimile apparatus further comprising printing means for printing out the OCR document sheet in which any contents of an order are not written according to a piece of OCR sheet format information stored in the format information storing means, the contents of the order being written in the OCR document sheet by a transmitter, and the contents of the order being read by the reading means.

In the above configuration, an OCR document sheet is printed out in the printing means according to the OCR sheet format information stored in the format information storing means, and contents of an order are written in the OCR document sheet by a transmitter. Thereafter, the contents of the order written in the OCR document sheet is read by the reading means. Therefore, pieces of image data are obtained. The image data are recognized in the character recognizing means according to the OCR document sheet recognizing program and the OCR sheet specifying information stored in the program storing means, and the image data are converted into pieces of character recognized data.

The character recognized data are displayed according to the display format information stored in the format information storing means. In this case, the character pattern generated by the character pattern generating means is also displayed to support the realization of the character recognized data displayed. Therefore, a transmitter can easily check whether or not the character recognized data displayed agree with the contents of the order.

The facsimile apparatus further comprising inputting means for inputting pieces of correcting data to correct the character recognized data obtained in the character recognizing means while referring the character recognized data and the character pattern displayed by the displaying means, the character recognized data corrected being transmitted to the OCR center apparatus by the data transmitting means.

In the above configuration, when the transmitter desires to correct the character recognized data, pieces of correcting data are input by the transmitter through the inputting means, and the character recognized data are correct. The character recognized data corrected are transmitted to an order-receiving center through the data transmitting means.

Accordingly, because the character pattern is displayed with the character recognized data to support the realization of the character recognized data displayed, the character recognized data can be easily realized by the transmitter. Therefore, the character recognized data can be easily corrected, and the character recognized data having no erroneous data can be transmitted to the order-receiving center. That is, an erroneous recognition of the order data at the order-receiving center can be considerably reduced.

The first object is also achieved by the provision of a facsimile apparatus comprising:

format information storing means for storing a piece of print format information;

program storing means for storing an OCR document sheet recognizing program and a piece of OCR sheet specifying information, the OCR document sheet recognizing program being utilized to recognize a piece of image data as a character, and the OCR sheet specifying information being utilized to specify a type of the OCR document sheet;

reading means for reading contents of an order written in an OCR document sheet and obtaining pieces of image data from the contents of the order;

character recognizing means for recognizing the image data obtained in the reading means according to the OCR document sheet recognizing program and the OCR sheet specifying information stored in the program storing means to convert the image data into pieces of character recognized data;

character pattern generating means for generating a character pattern which supports the realization of the character recognized data obtained in the character recognizing means;

data transmitting means for transmitting the character recognized data recognized by the character recognizing means to an order-receiving center to inform the order-receiving center of the contents of the order; and printing means for printing out the character recognized data recognized by the character recognizing means and the character pattern generated by the character pattern generating means according to the print format information stored in the format information storing means.

In the above configuration, pieces of image data are obtained by reading contents of an order written in an OCR document sheet in the reading means. The image data are recognized in the character recognizing means according to the OCR document sheet recognizing program and the OCR sheet specifying information stored in the program storing means, and the image data are converted into pieces of character recognized data. The character recognized data are transmitted to an order-receiving center to inform the contents of the order. Also, the character recognized data and a character generated by the character pattern generating means are printed out by the printing means according to the print format information stored in the format information storing means.

Accordingly, because the character recognized data which is the same as those transmitted to the order-receiving center are printed out, an transmitter can confirm the character recognized data transmitted to the order-receiving center. Therefore, because the transmitter can inform the order-receiving center of one or more errors of the character recognized data when the transmitter finds out the errors from the character recognized data printed, an erroneous recognition of the order data at the order-receiving center can be considerably reduced.

The first object is also achieved by the provision of a communication system comprising:

an OCR center apparatus;

a plurality of facsimile apparatuses for respectively communicating with the OCR center apparatus; and a plurality of communication lines for respectively connecting the OCR center apparatus and one of the facsimile apparatuses, each of the facsimile apparatuses comprising program storing means for storing an OCR document sheet recognizing program and a piece of OCR sheet specifying information, the OCR document sheet recognizing program being utilized to recognize a piece of image data as a character and the OCR sheet specifying information being utilized to specify a type of the OCR document sheet;

reading means for reading contents of an order written in an OCR document sheet and obtaining pieces of image data from the contents of the order, character recognizing means for recognizing the image data obtained in the reading means according to the OCR document sheet recognizing program and the OCR sheet specifying information stored in the program storing means to convert the image data into pieces of character recognized data, character pattern generating means for generating a character pattern which supports the realization of the character recognized data obtained in the character recognizing means, and data transmitting means for transmitting the character recognized data obtained in the character recognizing means to the OCR center apparatus to inform the OCR center apparatus of the contents of the order.

Each of the facsimile apparatuses further comprising:

inputting means for inputting pieces of correcting data to correct the character recognized data obtained in the character recognizing means while referring the character recognized data and the character pattern displayed by the displaying means, the character recognized data corrected being transmitted to the OCR center apparatus by the data transmitting means.

In the above configuration, pieces of character recognized data are obtained in the character recognizing means by converting contents of an order written in an OCR document sheet and are corrected in the inputting means. The character recognized data corrected are transmitted to the OCR center apparatus. Also, the character recognized data and a character pattern generated in the character pattern generating means are displayed in a displaying means to confirm the character recognized data transmitted to the OCR center apparatus with the support of the character pattern.

Accordingly, because the character pattern is displayed with the character recognized data to support the realization of the character recognized data displayed, the character recognized data can be easily checked by a transmitter, and the character recognized data checked can be transmitted to the center apparatus.

Also, a piece of OCR sheet format information and a piece of display format information are modified or newly produced in the OCR center apparatus and are transmitted to the facsimile apparatus.

Accordingly, even though it is required to modify or newly produce a format of the OCR document sheet, the OCR sheet format information and the display format information relating to a modified or newly produced OCR document sheet can be immediately transmitted to the facsimile apparatus. Therefore, an updated OCR document sheet can be always used in each of the facsimile apparatuses. Also, any trouble resulting from the use of an old type OCR document sheet can be avoided.

The first object is also achieved by the provision of a communication system comprising:

an OCR center apparatus for modifying or newly producing a piece of OCR sheet specifying information and a piece of display format information, the OCR sheet specifying information being utilized to specify a type of the OCR document sheet;

a plurality of facsimile apparatuses for respectively communicating with the OCR center apparatus; and a plurality of communication lines for respectively connecting the OCR center apparatus and one of the facsimile apparatuses, each of the facsimile apparatuses comprising format information storing means for storing the display format information transmitted from the OCR center apparatus through one of the communication lines, program storing means for storing an OCR document sheet recognizing program and the OCR sheet specifying information, the OCR document sheet recognizing program being utilized to recognize a piece of image data as a character, reading means for reading contents of an order and an identification mark of a transmitter written in the OCR document sheet, obtaining pieces of image data from the contents of the order and obtaining a piece of identification data from the identification mark, character recognizing means for recognizing the image data and the identification data obtained in the reading means according to the OCR document sheet recognizing program and the OCR sheet specifying information stored in the program storing means to convert the image data into pieces of character recognized data and to convert the identification data into a piece of bit data, character pattern generating means for generating a character pattern which supports the realization of the character recognized data obtained in the character recognizing means, data transmitting and receiving means for transmitting a piece of combined data obtained by combining the character recognized data and the bit data obtained in the character recognizing means to the OCR center apparatus, and receiving the combined data transmitted to the OCR center apparatus, and displaying means for displaying the combined data received in the data transmitting and receiving means and the character pattern generated by the character pattern generating means according to the display format information stored in the format information storing means.

In the above configuration, a piece of OCR sheet specifying information and a piece of display format information are modified or newly produced in the OCR center apparatus and are transmitted to a facsimile apparatus. In the facsimile apparatus, pieces of character recognized data and a piece of bit data are obtained in the character recognizing means by converting contents of an order and an identification mark written in an OCR document sheet, and a piece of combined data composed of the character recognized data and the bit data is transmitted to the OCR center apparatus. Therefore, the contents of the order and the identification mark are recorded in the OCR center apparatus. Thereafter, the combined data is sent back to the facsimile apparatus and is displayed with a character pattern generated by the character pattern generating means according to the display format information.

Accordingly, because the contents of the order are sent back to the facsimile apparatus and are displayed, the transmitter can easily confirm whether the contents of the order are correctly transmitted to the OCR center apparatus.

The second object is achieved by the provision of a facsimile apparatus comprising:

reading means for reading ordering characters written in an OCR document sheet;

character recognizing means for recognizing the ordering characters read by the reading means to produce one or more pieces of character recognized data;

transmitting means for transmitting the character recognized data produced by th character recognizing means to a center apparatus;

character supplying means for supplying one or more strains of fixed characters predetermined and one or more strains of converted characters indicating meanings of the character recognized data produced by the character recognizing means; and displaying means for displaying the character recognized data produced by th character recognizing means, the strains of fixed characters combined with the character recognized data and the strains of converted characters combined with the character recognized data.

In the above configuration, one or more pieces of character recognized data are produced in the character recognizing means by recognizing ordering characters written in an OCR document sheet. The character recognized data are transmitted to a center apparatus by the transmitting means. Also, the character recognized data are displayed by the displaying means. In this case, one or more strains of fixed characters predetermined and one or more strains of converted characters indicating meanings of the character recognized data are supplied by the character supplying means and are displayed by the displaying means in connection with the character recognized data to support the realization of the character recognized data.

Accordingly, because the character recognized data are displayed with the strains of fixed characters and the strains of converted characters, the meanings of the character recognized data can be easily recognized.

The second object is also achieved by the provision of a facsimile apparatus comprising:

reading means for reading ordering characters written in an OCR document sheet;

character recognizing means for recognizing the ordering characters read by the reading means to produce one or more pieces of character recognized data;

transmitting means for transmitting the character recognized data produced by th character recognizing means to a center apparatus;

character supplying means for supplying one or more strains of fixed characters predetermined and one or more strains of converted characters indicating meanings of the character recognized data produced by the character recognizing means; and printing means for printing out the character recognized data produced by th character recognizing means, the strains of fixed characters combined with the character recognized data and the strains of converted characters combined with the character recognized data.

In the above configuration, one or more pieces of character recognized data are produced in the character recognizing means in the same manner and are transmitted to a center apparatus by the transmitting means. Also, the character recognized data are printed out to record the ordering characters in a recording sheet by the printing means. In this case, one or more strains of fixed characters predetermined and one or more strains of converted characters indicating meanings of the character recognized data are supplied by the character supplying means and are printed out by the printing means in connection with the character recognized data to support the realization of the character recognized data.

Accordingly, because the character recognized data are printed out with the strains of fixed characters and the strains of converted characters, the meanings of the character recognized data can be easily recognized.

BRIEF DESCRIPTION OF THE DRAWINGS

The objects, features and advantages of the present invention will be apparent from the following description taken in conjunction with the accompanying drawings, in which:

FIG. 5 shows constitutional items of OCR sheet format information including format recognition information;

FIG. 6 shows an OCR document sheet prepared according to the OCR sheet format information shown in FIG. 5;

FIG. 7 shows the display format information or the print format information stored in a format information storing unit shown in FIG. 2;

FIG. 8 shows the contents of an order displayed with a plurality of character patterns according to the display format information;

FIG. 12 is an example of the character recognizing data which are transmitted to the OCR center apparatus and are printed with the character patterns, bit data and font data;

FIG. 19 shows an example of an OCR document sheet according to the second embodiment;

FIG. 20 shows an example of an optical character recognized result of the numerals displayed on a display shown in FIG. 18;

FIG. 21A shows a code converting table (No.1) of OCR sheet format information stored in a format information storing unit shown in FIG. 18;

FIG. 21B shows a code converting table (No.2) of OCR sheet format information stored in the format information storing unit;

FIG. 22 shows an example of a piece of display format information of the OCR sheet format information stored in the format information storing unit;

FIG. 26 shows an example of the returned data displayed in the display; and

FIG. 27 shows an example of a combined image which is formed by the character recognized data and the returned data and is printed out in the recording element.

DESCRIPTION OF THE PREFERRED EMBODIMENTS

A first embodiment of a facsimile apparatus and a communication system according to the present invention is described with reference to FIGS. 1 to 16 to solve the first object.

Figure 1:
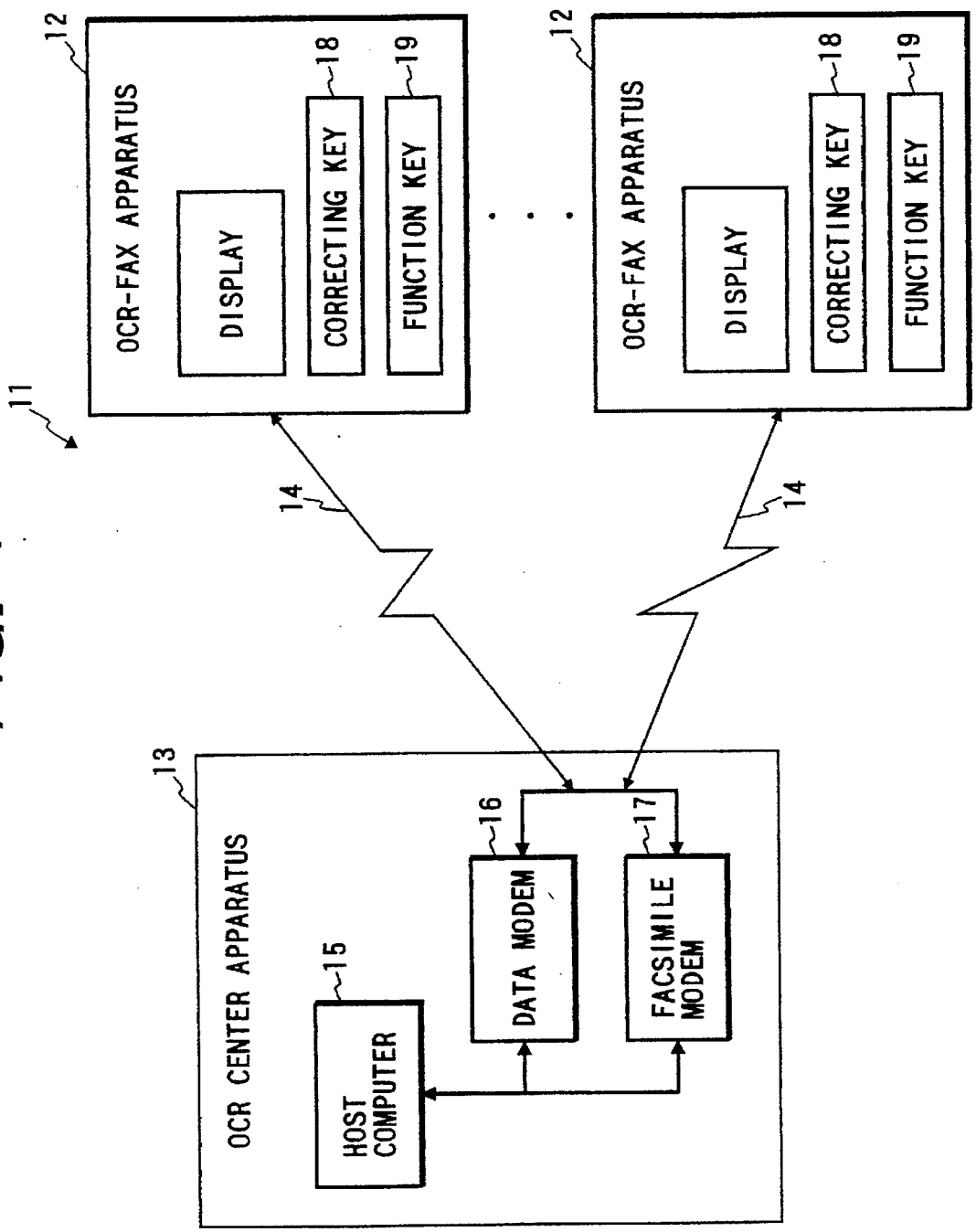
FIG. 1 is a block diagram of a communication system according to a first embodiment of the present invention.

FIG. 1 is a block diagram of a communication system according to a first embodiment of the present invention.

As shown in FIG. 1, a communication system 11 comprises a plurality of optical character recognition (OCR)-facsimile (FAX) apparatuses 12 placed at a plurality of order terminal sides, and an OCR center apparatus 13 which is placed at an order-receiving center and is connected to the OCR-FAX apparatuses 12 through a plurality of communication lines 14. Each of the OCR-FAX apparatuses 12 has an OCR function for recognizing pieces of entry information written in an OCR document sheet to convert the entry information into pieces of character recognized data, a facsimile communication function for facsimile-transmitting pieces of image data read from a facsimile manuscript to the OCR center apparatus 13 and receiving the image data transmitted from the apparatus 13, and a data communication function for transmitting various types of code data including the character recognized data to the center apparatus 13 and receiving the code data transmitted to the center apparatus 13.

Each of the OCR-FAX apparatuses 12 is provided with a display for displaying the character recognized data, a correcting key 18 for correcting the character recognized data in case where a transmitter finds out one or more errors from the character recognized data which indicate the entry information such as contents of an order, and a function key 19 for switching from an operation such as a display operation, a print operation, a transmission operation or the like to another operation.

The OCR center apparatus 13 comprises a host computer 15 having a facsimile function and a data communication function, a data modem 16 for modulating and demodulating pieces of of code data transmitted between the OCR-FAX apparatuses 12 and the host computer 15, and a facsimile modem 17 for modulating and demodulating pieces of of image data transmitted between the OCR-FAX apparatuses 12 and the host computer 15. In the host computer 18 of the center apparatus 13, a plurality of orders transmitted from each of the OCR-FAX apparatuses 12 as the code data are stored in tabular form, the orders are returned to the OCR-FAX apparatuses 12 through the data modem 16 to confirm the orders in each of the OCR-FAX apparatuses 12, and pieces of OCR sheet format information of the OCR document sheet are altered or newly produced. The OCR sheet format information are down-loaded to the OCR-FAX apparatuses 12 through the data modem 16.

Each of the OCR-FAX apparatuses 12 is, for example, placed at a branch office or a business office of an order terminal side.

Figure 2:
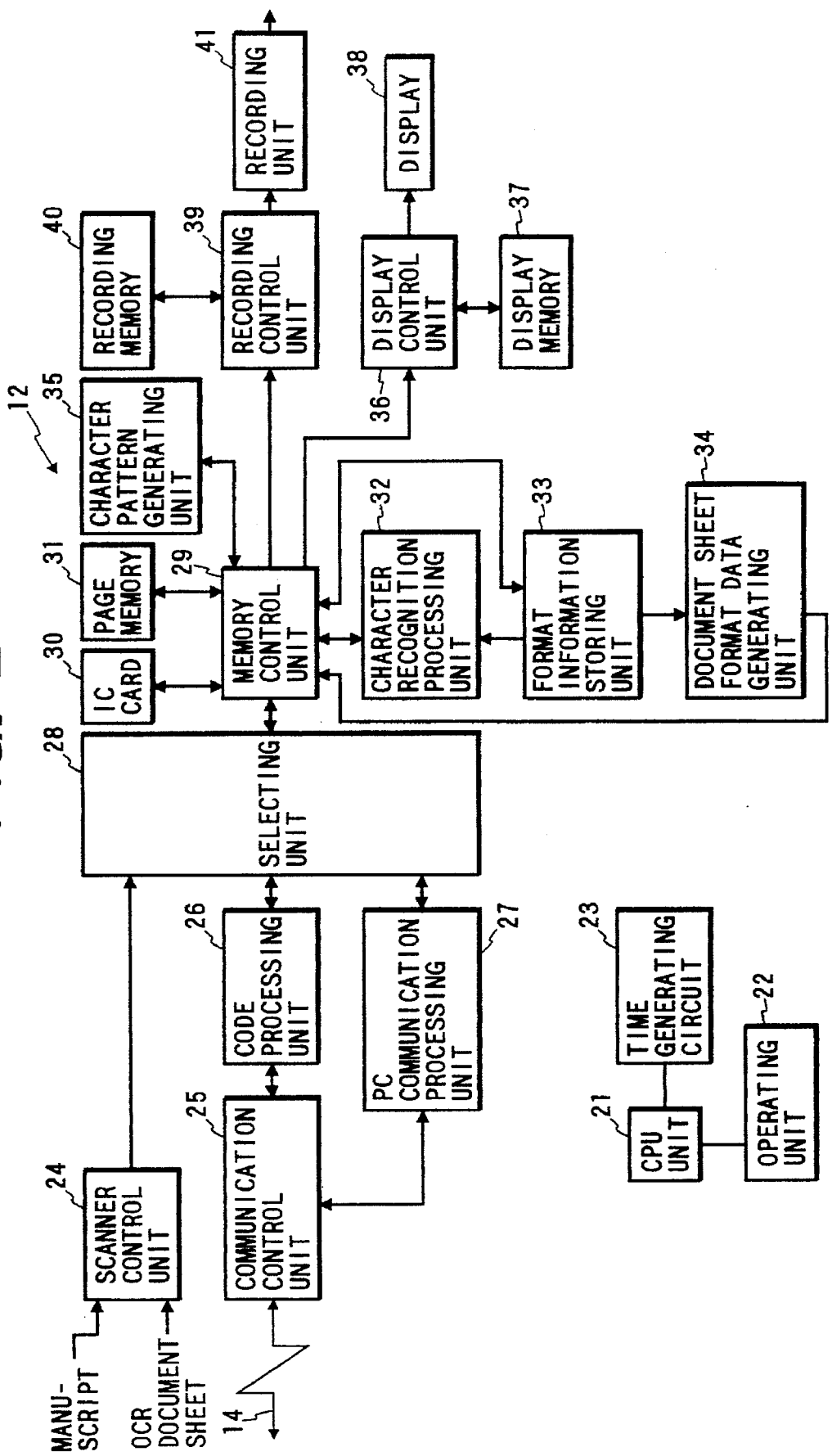
FIG. 2 is a block diagram showing the configuration of each of OCR-FAX apparatuses shown in FIG. 1.

FIG. 2 is a block diagram showing the configuration of each of the OCR-FAX apparatuses 12.

As shown in FIG. 2, the facsimile apparatus 12 comprises a central processing unit (CPU) 21 for controlling all of units in the apparatus 12, an operating unit 22 such as a keyboard having the correcting key 18 and the function key 19 for inputting various types of data and instructions to perform the correction of the image data obtained by the character recognition, the transmission of the image data, the display of the image data on the display 15, and the print of the image data, a time generating circuit 23 for supplying pieces of time information required to display various types of times such as a transmitted date, a transmitted time, a producing time of the OCR document sheet and the like, a scanner control unit 24 for controlling a scanner to read contents written in a facsimile manuscript or contents of an order written in an OCR document sheet and obtaining pieces of facsimile data of the contents of the facsimile manuscript or obtaining the image data of the contents of the order, a communication control unit 25 for selecting one modem from among a facsimile modem and a data modem (a pulse-code modem) according to pieces of data transmitted from/to the center apparatus 13 and for controlling the transmission of the data, a code processing unit 26 for compressing the facsimile data obtained in the scanner controlling unit 24 to transmit the facsimile data to the center apparatus 13 through the facsimile modem of the communication control unit 25 and expanding pieces of facsimile data received from the center apparatus 13 through the facsimile modem, a pulse-code (PC) communication processing unit 27 for processing the communication of pieces of code data transmitted between the center apparatus 13 and the facsimile apparatus 12 through the data modem of the communication control unit 25, and a selecting unit 28 for selecting an output or input from/to one unit from among those of the scanner control unit 24, the PC communication processing unit 25 and the code processing unit 26.

The facsimile apparatus 12 further comprises a memory control unit 29 for controlling pieces of data which are input to be stored in one of storing units or are output from one of the storing units, an integrated circuit (IC) card 30 for storing a piece of OCR document sheet specifying information utilized to specifying a type of the OCR document sheet and an OCR document sheet recognizing program utilized to recognize the image data and for functioning as an OCR apparatus in cooperation with the memory control unit 29, a page memory 31 for storing the image data obtained in the scanner control unit 24 and storing pieces of character recognized data obtained from the image data as the code data according to an optical character recognition, and a character recognition processing unit 32 for loading the OCR document sheet recognizing program and the OCR document sheet specifying information stored in the IC card 30, reading out the image data stored in the page memory 31, performing the optical character recognition according to the OCR document sheet recognizing program and the OCR sheet format information to convert the image data into the character recognized data, and transferring the character recognized data to the page memory 31.

The facsimile apparatus 12 further comprises a format information storing unit 33 for storing a piece of OCR sheet format information of the OCR document sheet including a piece of format recognition information of the OCR document sheet, a piece of display format information of the OCR document sheet, a piece of print format information of the OCR document sheet and a code conversion table which are down-loaded by the center apparatus 13 and are transmitted through the PC communication processing unit 27 as the code data, a document sheet format data generating unit 34 for generating pieces of document sheet format data required to print the OCR document sheet, a character pattern generating unit 35 for generating character patterns such as "commodity names", "commodity codes", "the number of commodities ordered", "the number of commodities returned", "a slip of ordered commodities or returned commodities" and "a store name" which support the realization of the character recognized data displayed or printed according to the code conversion table stored in the format information storing unit 33, a display control unit 36 for controlling the display of the character recognized data stored in the page memory 31 to make a layout of the character recognized data agreeing with that of the contents of the order handwritten in the OCR document sheet according to the display format information stored in the format information storing unit, a display memory 37 for storing the character recognized data under the control of the display control unit 36, a display 38 for displaying the character recognized data stored in the display memory 37 and the character patterns generated by the character pattern generating unit 35, a recording control unit 39 for controlling the print of the character recognized data stored in the page memory 31 to make a layout of the character recognized data agreeing with that of the contents of the order handwritten in the OCR document sheet according to the print format information stored in the format information storing unit, a record memory 40 for storing the character recognized data under the control of the recording control unit 39, and a recording unit 41 such as a printer for printing the OCR document sheet, in which any order is not written, according to the document sheet format data generated in the document sheet format data generating unit 34 and for printing the character recognized data stored in the recording memory 40, the character patterns generated by the character pattern generating unit 35, a date, a time and an identification number of a transmitter to record the character recognized data transmitted to the center apparatus 13 in a recording paper.

In the above configuration, the operation of the facsimile apparatus 12 and the communication system 13 is described.

Figure 3:
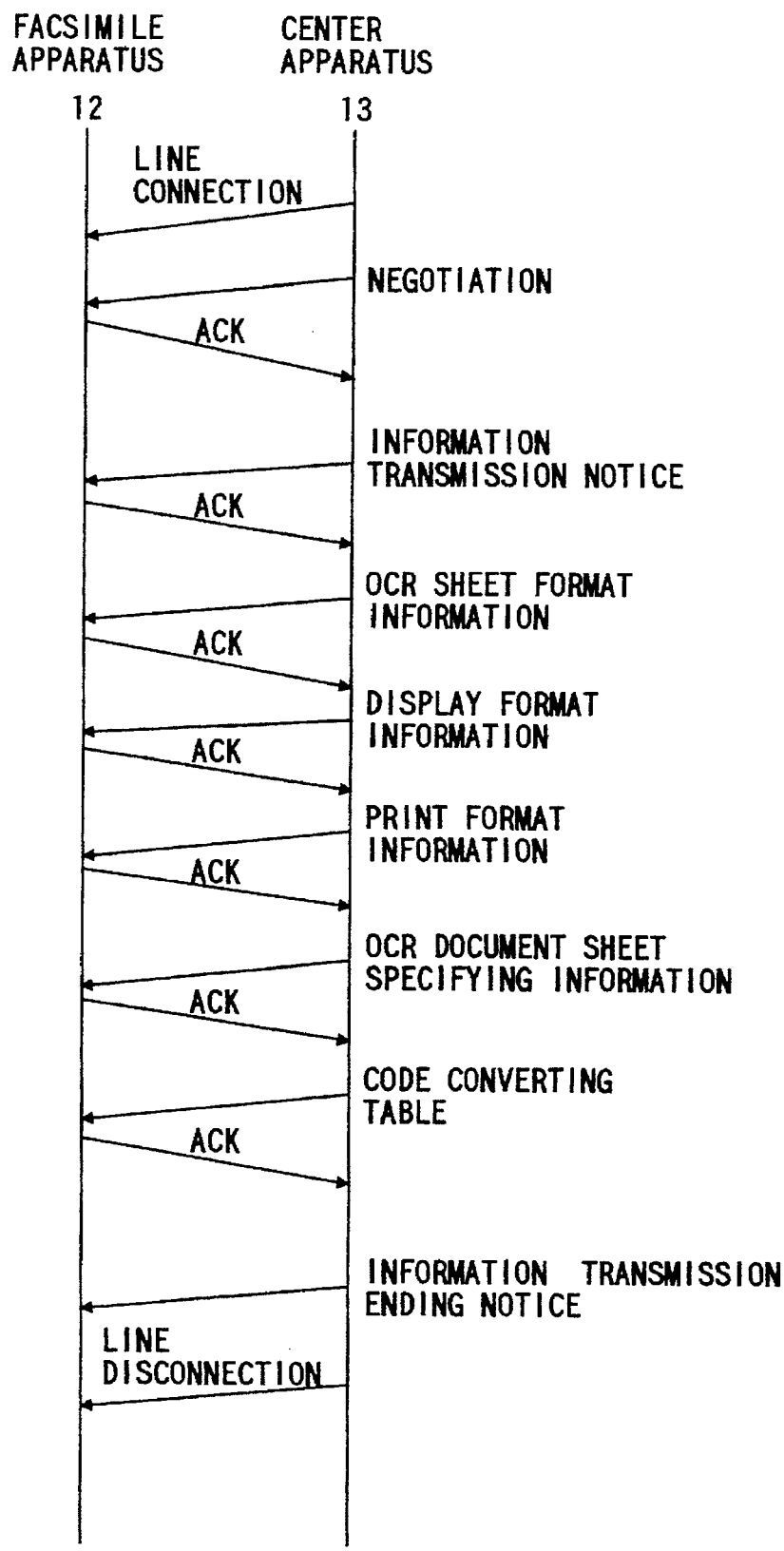
FIG. 3 shows the procedure for down-loading various types of format information from an OCR center apparatus to the OCR-FAX apparatus.

FIG. 3 shows the procedure for down-loading the various types of format information expected to be stored in the IC card 30 or the format information storing unit 33 from the center apparatus 13 to the facsimile apparatus 12.

As shown in FIG. 3, a line connection between the OCR center apparatus 13 and a particular facsimile apparatus 12 is initially performed by the center apparatus 13. Thereafter, a negotiation signal is output from the apparatus 13 to the facsimile apparatus 12 to negotiate whether or not the connection of a communication line 14 between the apparatuses 12 and 13 is allowed. When an acknowledge (ACK) signal is sent from the facsimile apparatus 12 to the center apparatus 13, an information transmission notice is sent from the center apparatus 13 to the facsimile apparatus 12, the facsimile apparatus 12 is set in an information receiving condition, and an acknowledge (ACK) signal is sent from the facsimile apparatus 12 to the center apparatus 13. Therefore, the preparation of the information transmission is finished. Thereafter, the OCR sheet format information including the format recognition information is sent to the facsimile apparatus 12. When an acknowledge (ACK) signal is sent from the facsimile apparatus 12 to the center apparatus 13, the display format information is sent to the the facsimile apparatus 12. When an acknowledge (ACK) signal is sent from the facsimile apparatus 12 to the center apparatus 13, the print format information, a piece of OCR document sheet specifying information and a code conversion table for converting the code data into characters are sent to the format information storing unit of the facsimile apparatus 12 in that order, in the same manner. Thereafter, a notice informing the end of the information transmission is sent to the facsimile apparatus 12, and the communication line 14 is disconnected by the center apparatus 13.

Figure 4:
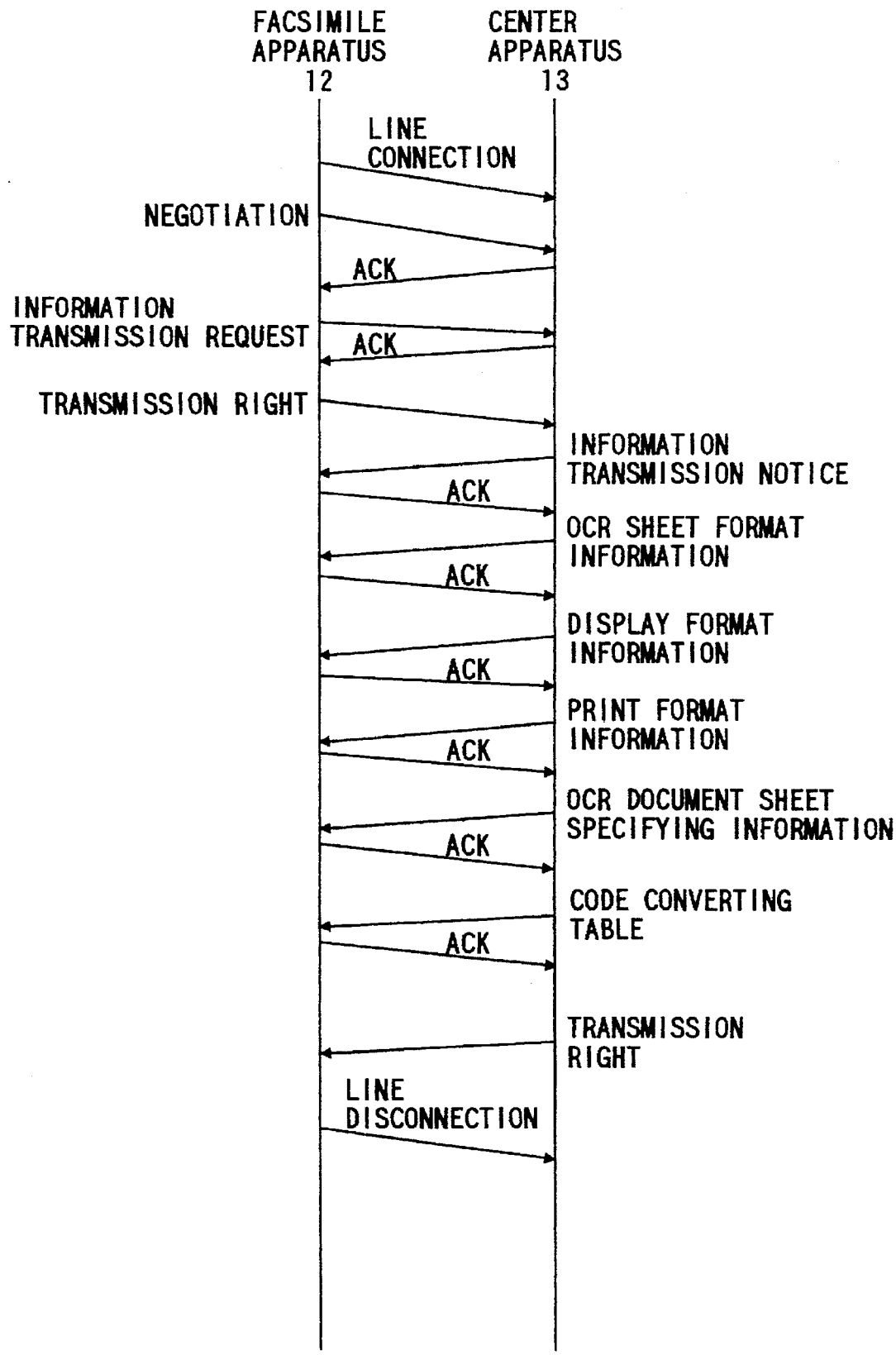
FIG. 4 shows the procedure for requesting the OCR center apparatus to send the various types of format information.

FIG. 4 shows the procedure for requesting the center apparatus 13 to send the various types of format information expected to be stored in the IC card 30 or the format information storing unit 33.

As shown in FIG. 4, a line connection between the OCR center apparatus 13 and a particular facsimile apparatus 12 is initially performed by the facsimile apparatus 12. Thereafter, a negotiation signal is output from the facsimile apparatus 12 to the center apparatus 13 to negotiate whether or not the connection of a communication line 14 between the apparatuses 12 and 13 is allowed. When an acknowledge signal (ACK) is sent from the center apparatus 13 to the facsimile apparatus 12, an information transmission request is sent from the facsimile apparatus 12 to the center apparatus 18, the center apparatus 13 is set in an information receiving condition, and an acknowledge signal (ACK) is sent from the center apparatus 18 to the facsimile apparatus 12. Thereafter, a transmission right of the information is transferred to the center apparatus 13. Therefore, the preparation of the information transmission is finished, and the OCR sheet format information, the display format information, the print format information, the OCR document sheet specifying information and the code conversion table are sent to the facsimile apparatus 12 in the same manner as in FIG. 3. When the information transmission is finished, the transmission right is transferred to the facsimile apparatus 12, and the communication line 14 is disconnected by the facsimile apparatus 12.

FIG. 5 shows constitutional items of the OCR sheet format information including the format recognition information, and FIG. 6 shows an OCR document sheet prepared according to the OCR sheet format information shown in FIG. 5.

As shown in FIG. 6, an item 71 is a sheet mark indicating that a sheet set on the scanner of the scanner control unit 24 is an OCR document sheet. An item 72 is a timing mark indicating that one or more recognition blocks exist at the right side of the timing mark. An item 73 is a character area in which a character is handwritten. The character area is made to be a drop-out color not detected by a scanner when the OCR document sheet is prepared according to a color printing. Also, when the OCR document sheet is printed by the recording unit 41, a border line of the character area is printed to be black. However, a character written in the character area is selectively recognized, and the black border line is ignored. Three character areas are arranged in one recognition block. An item 74 is a signature area for confirming a transmitter. A symbol written in the signature area is sent to the center apparatus 13.

As shown in FIG. 5, items 41 to 45 indicate conditions set in the facsimile apparatus 12 in advance, items 46 to 52 indicate parameters for optically recognizing the sheet mark 71, items 53 to 65 indicate parameters for optically recognizing the timing marks 72, and items 66 to 68 indicate the print format information of the OCR document sheet. An input image top address in the item 41 indicates a physical address value of the page memory 31. An input image lateral width in the item 42 indicates a lateral width size (for example, A4 or B4 in Japanese standards) of an image of the OCR document sheet read in the scanner control unit 24. The item 43, for example, indicates the resolution of 8 dots/mm in a main scanning direction and the resolution of 7.7 dots/mm in a secondary scanning direction. A reject coefficient in the item 44 determines the number of feature points in a character required to recognize the contents of an order. When the reject coefficient is high, though many characters written in the OCR document sheet cannot be recognized, a probability that a character written in the OCR document sheet is correctly recognized is high. An inclination detecting mark range in the item 45 determines an allowable range of a curvature of the OCR document sheet.

A format recognizing OMR table in the item 46 indicates a table of sheet marks written in various types of OCR document sheets. The number of marks in the item 47 indicates the number of sheet marks written in an OCR document sheet. A top mark X coordinate in the item 48 indicates an X coordinate of a first sheet mark in the OCR document sheet. A mark width in the item 49 and a mark height in the item 50 respectively indicate pieces of information for recognizing an area of a sheet mark. In case of a printing operation, the information denotes a piece of print information for recognizing a drop-out color area. The drop-out color can not be detected by a scanner of the scanner control unit 24 but see with a naked eye, and an yellow is used as the drop-out color. An X coordinate interval value in the item 51 indicates a correcting coefficient. The number of lines in the item 52 indicates the number of lines in which a sheet number of the OCR document sheet is written.

A timing mark detecting X coordinate in the item 53 and a timing mark detecting Y coordinate in the item 54 respectively indicate a piece of detecting position information of an OCR timing mark. A timing mark detecting width in the item 55 and a timing mark detecting height in the item 56 respectively indicate a piece of size information of a timing mark detected. The number of blocks in a line in the item 57 indicates the number of recognition blocks subsequent to the timing mark detected. The number of marks in the item 58 indicates the number of timing marks actually existing and also indicates the number of timing marks printed. A mark width in the item 59 indicates an actual width of a timing mark printed. A mark height in the item 60 indicates an actual height of a timing mark printed. An X coordinate interval value in the item 61 indicates a correcting value. The number of characters in the item 62, a taking-out X coordinate range of a fist character in the item 63, a taking-out width of a character in the item 64 and a taking-out height of a character in the item 65 respectively indicate a piece of character recognition taking-out block information in case of the optical character recognition and also indicate a piece of drop-out color area print information in case of a print operation. A document sheet preparation adding information in the item 66 indicates a piece of preparing information of a document sheet in case of the document sheet printing. A timing mark interval distance in the item 67 indicates a mark distance when marks are placed at equal intervals. $(X_1,Y_1)$ ,$(X_2,Y_2)$, - - - , and $(Xn,Yn)$ in the item 68 respectively indicate a piece of mark positional information when marks are placed at irregular intervals. The item 69 indicates the end of the various above information.

FIG. 7 shows the display format information or the print format information stored in the format information storing unit 33, and FIG. 8 shows the contents of an order displayed by the display 15 with a plurality of character patterns according to the display format information.

An item 81 indicates the number of image planes on which an OCR document sheet divided is displayed. An item 82 indicates piece of fixed image plane character data predetermined in the OCR document sheet. The meanings of the character data are expressed by the character patterns such as "commodity names", "commodity codes", "the number of commodities ordered", "the number of commodities returned", "a slip of ordered commodities or returned commodities", and "a store name". An item 83 indicates pieces of character recognition block data written in the OCR document sheet to order various commodities. The block data indicate numerals written in areas which are placed under the character patterns of "commodity codes", "the number of commodities ordered" and "the number of commodities returned". An item 84 indicates a conversion table for converting the character recognized data expected to be displayed into characters such as Japanese characters and letters indicating the same contents as those of the character recognized data. Each of the store names in an item 85 is indicated by a piece of code data specified by a numeral. However, in case where the commodity codes are indicated by pieces of code data, types of the commodities cannot be realized. Therefore, an item 86 indicates a conversion table for converting the commodity codes into characters such as Japanese characters and letters indicating the same contents as those of the commodity codes. Because the conversion table are used, the commodity codes are added in the OCR sheet shown in FIG. 6, and the character patterns expressing the commodity names are displayed or printed to support that a transmitter easily realizes the meaning of the character recognized data.

Next, the operation for recognizing the contents of an order written in an OCR document sheet to obtain pieces of character recognizing data, correcting the character recognizing data, transmitting the character recognizing data corrected to the center apparatus 13, and printing the character recognizing data corrected is described with reference to FIGS. 9 to 11.

Figure 9:
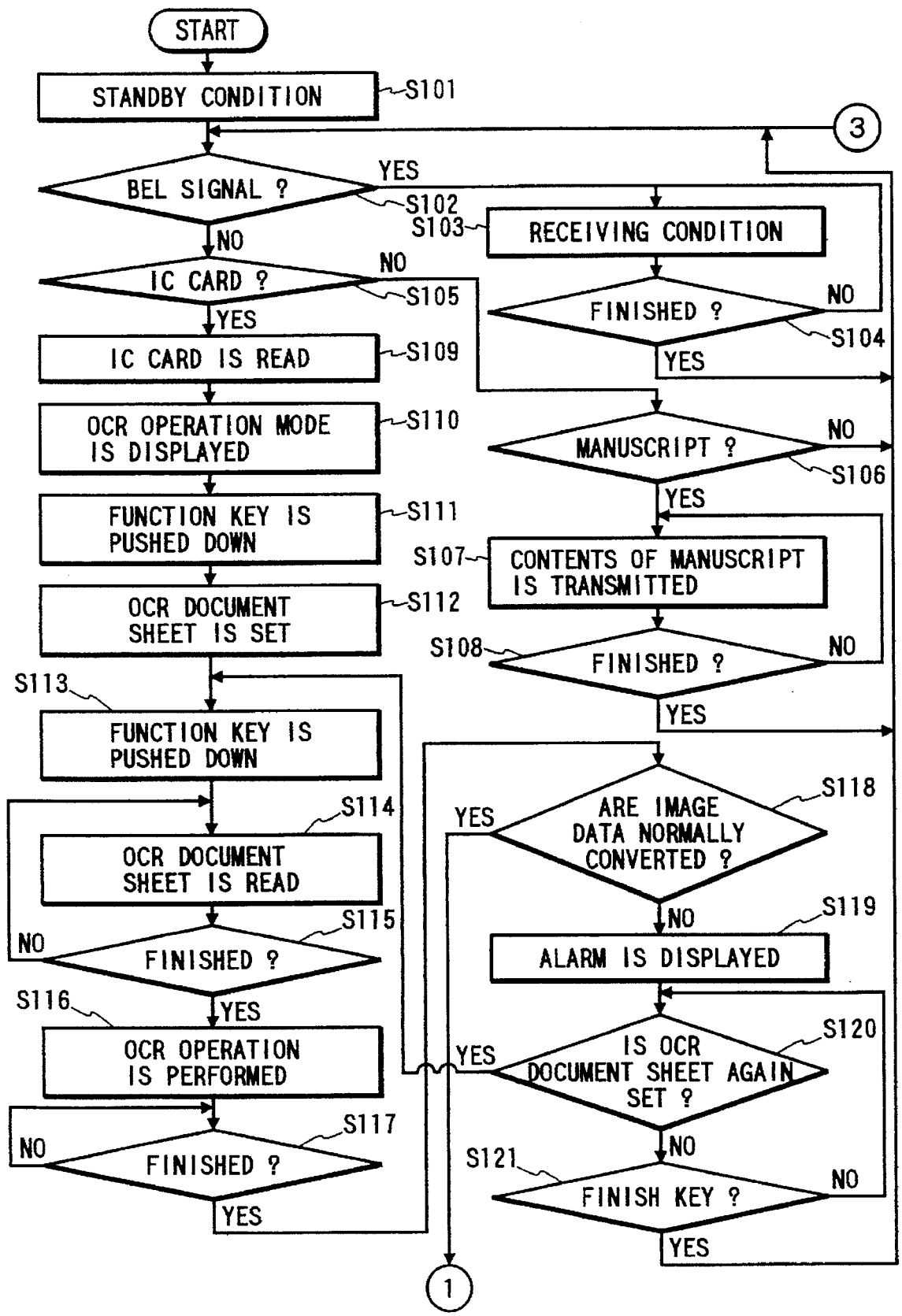
FIGS. 9 to 11 are a flow chart showing the operation for recognizing the contents of an order written in an OCR document sheet, correcting pieces of character recognizing data, transmitting the character recognizing data corrected to the OCR center apparatus, and printing the character recognizing data corrected.

As shown in FIG. 9, when the facsimile apparatus 12 is set in a standby condition (a step S101), it is monitored by the facsimile apparatus 12 whether or not a bel signal informing the reception of a negotiation signal from the center apparatus 13 is generated (a step S102). In case where the negotiation signal is received, the bel signal is generated, and the facsimile apparatus 12 is set in a receiving condition under the control of the CPU unit 21 to receive a piece of information from the center apparatus 13 (a step S103). Thereafter, it is judged by the CPU unit 21 whether or not the reception of the information is finished (a step S104).

When the reception of the information is finished, the procedure returns to the step S102.

In case where any bel signal is not generated in the step S102, it is judged by the CPU unit 21 whether or not the IC card 30 is inserted into the facsimile apparatus 12 to request the performance of an OCR operation (a step S105). When the IC card 30 is not inserted, it is judged by the CPU unit 21 whether or not a facsimile manuscript is set on a scanner to read contents of the manuscript (a step S106). When the facsimile manuscript is set, the contents of the manuscript is read by the scanner control unit 24, and the contents of the manuscript is transmitted to the center apparatus 13 through the code processing unit 26 and the communication control unit 25 (a step S107). When the transmission of the facsimile manuscript is finished (a step S108), the procedure returns to the step S102.

When the IC card 30 is inserted into the facsimile apparatus 12 in the step S105, the OCR document sheet recognizing program and the OCR document sheet specifying information stored in the IC card 30 is read out to the character recognition processing unit 32 (a step S109), the apparatus 12 is set in an OCR operation mode under the control of the CPU unit 21, and it is displayed on the display 15 that the facsimile apparatus 12 is set in the OCR operation mode (a step S110). Thereafter, the function key 19 is pushed down by the transmitter to start the OCR operation (a step S111). Thereafter, an OCR document sheet is set on the scanner (a step S112), and the function key 19 is pushed down to read the OCR document sheet (a step S113). In the OCR document sheet, the codes representing the commodity codes, the number of commodities ordered and the number of commodities returned are written, as shown in FIG. 6.

Thereafter, the codes of the OCR document sheet is read in the scanner controlling unit 24 (a step S114) as the image data, and the image data are stored in the page memory 31 through the selecting unit 28 and the memory control unit 29. When the reading of the codes and the storage of the image data are finished (a step S115), the image data is read out to the character recognition unit 32, and the OCR operation for the image data is performed according to the OCR document sheet recognizing program and the OCR document sheet specifying information read out in the step S109 (a step S116) to convert the image data into the character recognized data. When the OCR operation is finished (a step S117), the character recognized data is stored in the page memory 31. Thereafter, it is judged by the CPU unit 21 whether or not all of the image data are normally converted into the character recognized data (a step S118). For example, the OCR document sheet is set upside down, all of the image data are not normally converted. In this case, an alarm is displayed on the display 15 to urge the transmitter to again set the OCR document sheet in a correct position (a step 119). When the OCR document sheet is again set (a step S120), the procedure returns to the step S113 to again read the codes of the sheet. In cases where the transmitter intends to finish the OCR operation without again setting the OCR document sheet, the transmitter pushes down a finish key of the operating unit 22 (a step S121), and the procedure returns to the step S102.

Figure 10:
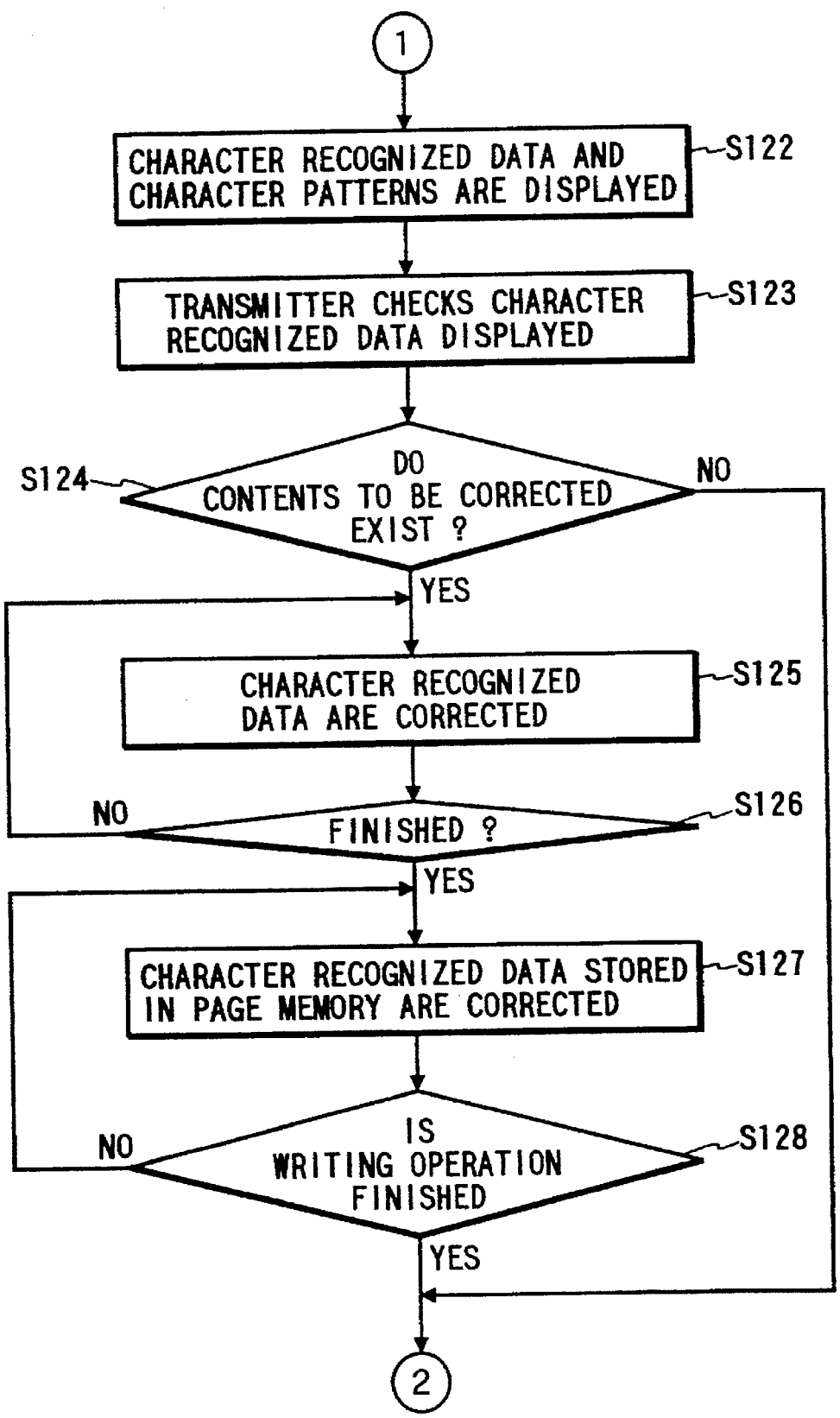

When all of the image data are normally converted in the step S118, as shown in FIG. 10, the procedure proceeds to a step S122. In the step S122, the character recognized data are stored in the display memory 37 to make a layout of the character recognized data agreeing with that of the contents of the order handwritten in the OCR document sheet according to the display format information stored in the format information storing unit 33 under the control of the display control unit 36. Also, the character patterns generated by the character pattern generating unit 35 according to the code conversion table are stored in the display memory 37 to make a connection with the character recognized data. Thereafter, as shown in FIG. 8, the character recognized data and the character patterns are displayed on the display 38 according to the display format shown in FIG. 7.

Therefore, because the character recognized data are displayed with the character patterns which support the realization of the character recognized data, the transmitter can easily realize what the character recognized data displayed on the display 38 mean, and the transmitter can judge whether or not the character recognized data agree with the contents of the order written in the OCR document sheet.

Thereafter, the transmitter checks the character recognized data displayed (a step S123), and it is judged by the transmitter whether or not one or more contents to be corrected exist in the character recognized data (a step S124). For example, the transmitter checks whether or not the character recognized data agree with the contents of the order written in the OCR document sheet while seeing the character patterns. Also, even though the character recognized data agree with the contents of the order, the transmitter checks whether or not one or more contents to be corrected exist in the contents of the order. When the transmitter desires to correct the character recognized data, the character recognized data are corrected by inputting pieces of correcting data through the operating unit 22 (a step S125). When the operator confirms that the correction of character recognized data displayed on the display 38 is finished (a step S126), the character recognized data stored in the page memory 31 are corrected by again executing the steps S112 to S118 (a step S127). Therefore, a writing operation of the corrected character recognized data to the page memory 31 is finished (a step S128).

Accordingly, because the character recognized data obtained by converting the contents of an order according to the optical character recognition are displayed with the character patterns in a tabular form, the transmitter can easily realize the meaning of the character recognized data displayed, and the transmitter can easily check whether or not the character recognized data are to be corrected.

Figure 11:
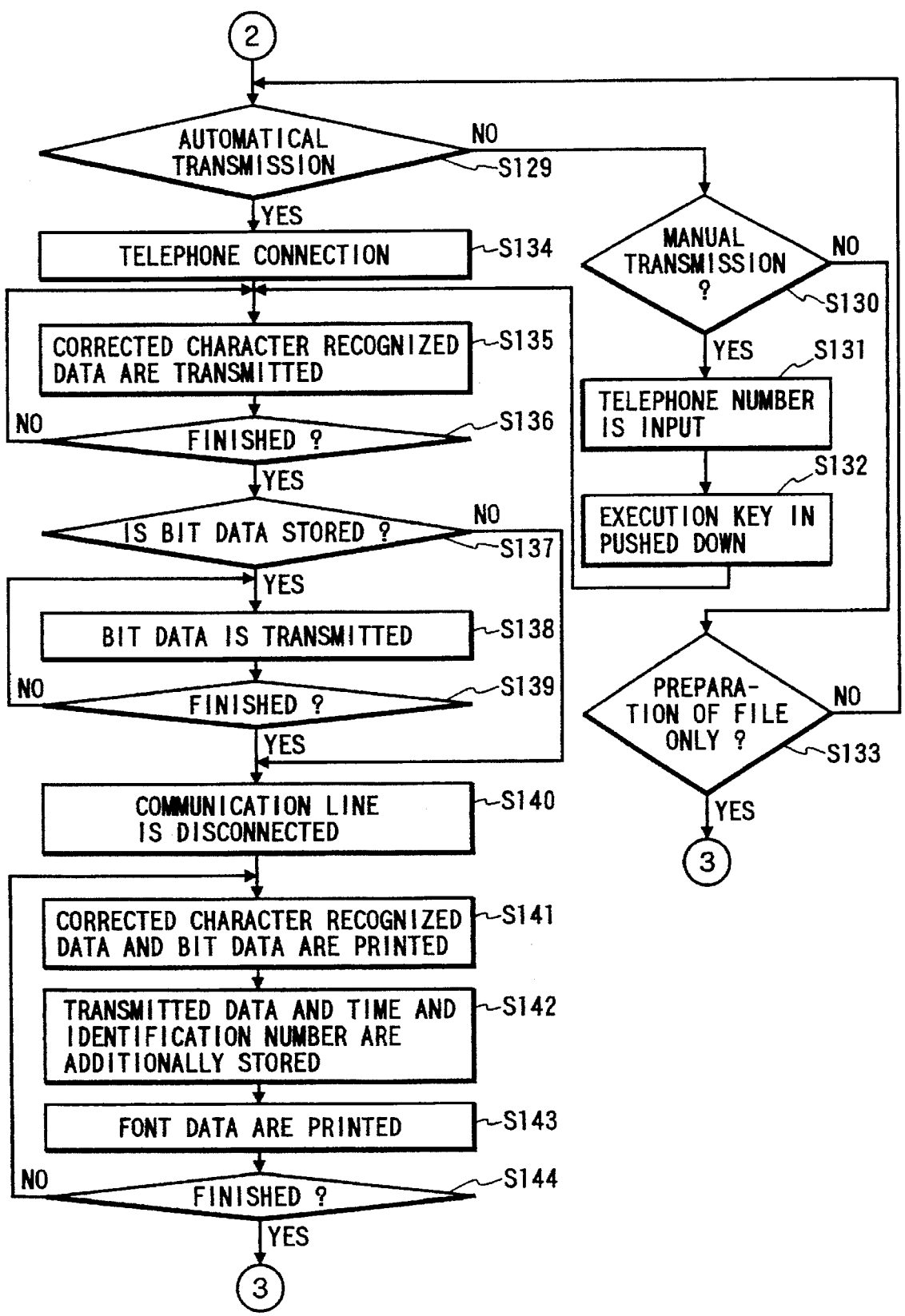

Thereafter, as shown in FIG. 11, the procedure proceeds to a step S129. In the step S129, it is judged by the transmitter whether or not the corrected character recognized data or the character recognized data checked are to be automatically transmitted to the center apparatus 13 according to a predetermined procedure. When the corrected character recognized data are not to be automatically transmitted, it is judged by the transmitter whether or not the corrected character recognized data are to be manually transmitted to the OCR center apparatus 13 (a step S130). When the corrected character recognized data are to be manually transmitted, a telephone number of the center apparatus 13 is input from the operating unit 22 (a step S131), an execution key of the operating unit 22 is pushed down to telephone-connect the facsimile apparatus 12 with the center apparatus 13 (a step 132). In contrast, when the corrected character recognized data are not to be manually transmitted in the step S130, the procedure returns to the step S102 when the transmitter intends only to prepare a character recognized data file (a step S133).

When the corrected character recognized data are to be automatically transmitted in the step S129, the facsimile apparatus 12 is automatically telephone-connected with the center apparatus 13 (a step S134). After the step S134 or the step S132, the corrected character recognized data stored in the page memory 31 are transmitted as the code data to the center apparatus 13 through the PC communication processing unit 27 and the data modem of the communication control unit 25 (a step S135). When the transmission of the corrected character recognized data is finished (a step S136), it is judged by the CPU unit 21 whether or not bit data is stored in the page memory 31 (a step S137). The bit data is obtained by reading a signature or a seal impression of a transmitter written in the signature area of the OCR document sheet shown in FIG. 6 and converting the signature or the seal impression in the character recognition processing unit 32. When the bit data is stored, the bit data subsequent to the corrected character recognized data is transmitted to the center apparatus 13 (a step S138). When the transmission of the bit data is finished (a step S139), the communication between the apparatuses 12 and 13 is completed. Therefore, the communication line 14 between the apparatuses 12 and 13 is disconnected (a step S140).

Accordingly, because the corrected character recognized data or the character recognized data checked are transmitted to the center apparatus 13, any character recognition operation or any correcting operation for the corrected character recognized data is not required. Therefore, an efficiency of an order operation in the communication system 11 can be improved.

Also, because the bit data indicating the signature or the seal impression of the transmitter is transmitted to the center apparatus 13 with the corrected character recognized data, a receiver at a center apparatus side can place reliance on the corrected character recognized data.

Thereafter, to record the transmitted data sent to the center apparatus 13, the corrected character recognized data and the bit data stored in the page memory 31 are also stored in the recording memory 40 to make a layout of the corrected character recognized data agreeing with that of the contents of the order handwritten in the OCR document sheet according to the print format information stored in the format information storing unit 33 under the control of the recording control unit 39. Also, the bit data are arranged in the recording memory 40 to make a connection with the corrected character recognized data under the control of the recording control unit 39. Thereafter, the corrected character recognized data and the bit data are printed out by the function of the recording unit 41 as shown in FIG. 12 (a step S141). In addition to the corrected character recognized data, a transmitted date, a transmitted time and an identification number of a transmitter are additionally stored in the recording memory 40 as pieces of font data to make a connection with the corrected character recognized data (a step S142), and the font data are printed out by the function of the recording unit 41 as shown in FIG. 12 (a step S143). The transmitted date and the transmitted time are generated in the time generating circuit 23, and the identification number is input through the operating unit 22. When the printing of the corrected character recognized data and the font data are completed (a step S144), a data transmitting process of the contents of the order is finished.

Accordingly, because the transmitted date, the transmitted time and the identification number of the transmitter are additionally recorded, the transmitter can easily confirm the corrected character recognized data transmitted to the center apparatus 13.

Next, a printing operation of the OCR document sheet is described with reference to FIG. 13.

When the format of the OCR document sheet is modified, a new type of OCR document sheet is prepared, or the transmission of the OCR document sheet format information from the center apparatus 13 is requested by the facsimile apparatus 12, a piece of updated OCR document sheet format information is immediately transmitted from the center apparatus 13 to the facsimile apparatus 12, and an updated OCR document sheet is printed out by the function of the recording unit 41 according to the updated OCR document sheet format information transmitted. Thereafter, contents of an order are written in the updated OCR document sheet, and the contents of the order are read in the scanner control unit 24. Therefore, the erroneous use of the OCR document sheet not updated can be prevented. Also, when all of the OCR document sheets printed are used up, the OCR document sheet is printed.

Figure 13:
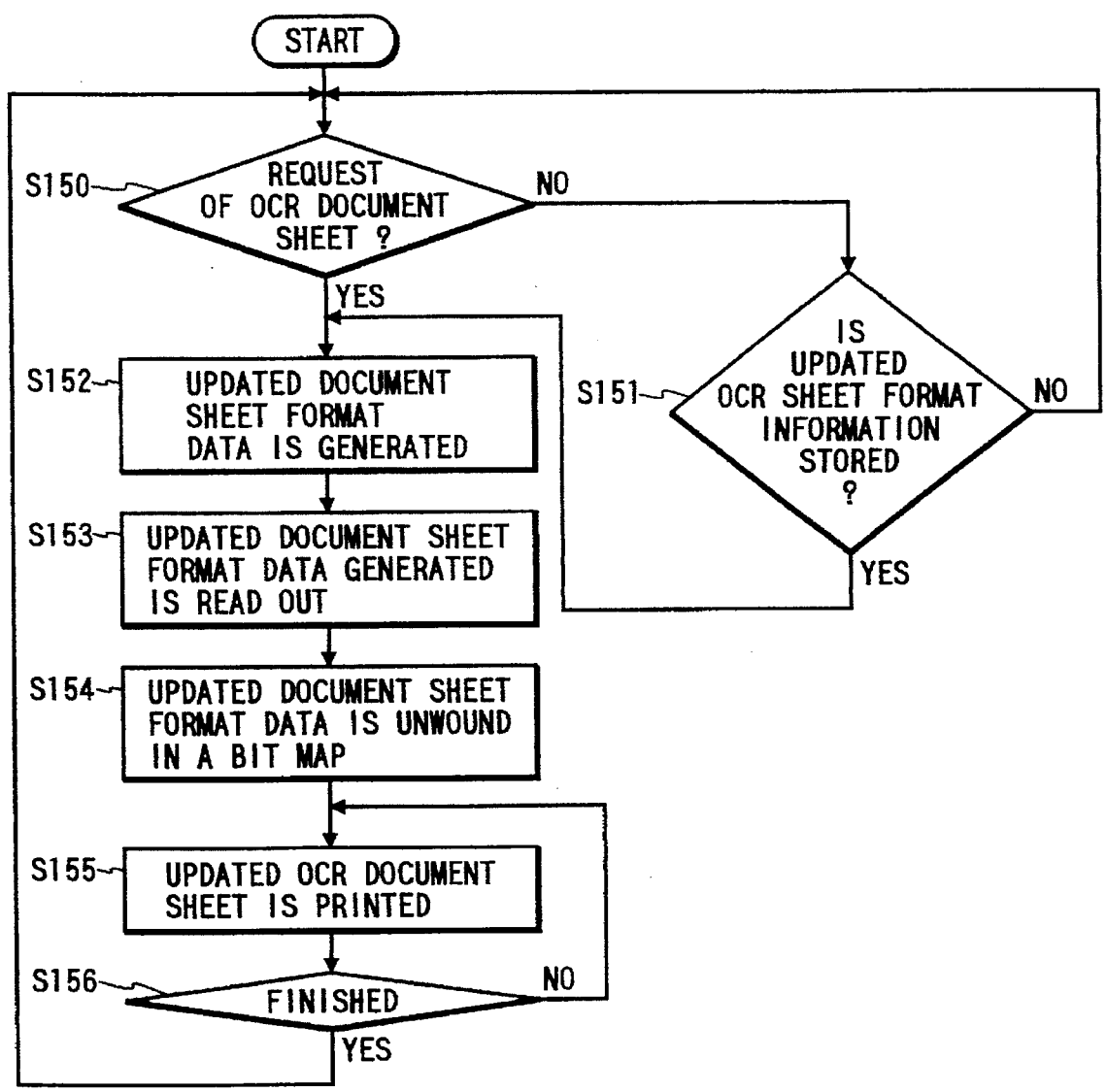
FIG. 13 is a flow chart showing the procedure for outputting the OCR document sheet.

In detail, as shown in FIG. 13, it is judged by the CPU unit 21 whether or not the transmitter requests the facsimile apparatus 12 to print the OCR document sheet (a step S150). When the printing of the OCR document sheet is not requested, it is judged by the CPU unit 21 whether or not a piece of updated OCR sheet format information transmitted from the center apparatus 13 is stored in the format information storing unit 33 without using the updated OCR sheet format information to print out an updated OCR document sheet (a step S151). When the transmitter requests to print the OCR document sheet or the updated OCR sheet format information is stored in the format information storing unit 33, a piece of updated document sheet format data required to prepare an updated OCR document sheet specified by a first document number is generated according to the updated OCR sheet format information in the document sheet format data generating unit 34 (a step S152). Thereafter, when the printing of an OCR document sheet specified by a second document number is requested by the transmitter, the updated document sheet format data generated is read out to the memory control unit 29 on condition that the first document number of the updated OCR document sheet is the same as the second document number of the OCR document sheet requested (a step S153), and the updated document sheet format data is stored in the recording memory 40 to be unwound in a bit map according to a piece of updated print format information transmitted subsequently to the updated OCR sheet format information under the control of the recording control unit 39 (a step S154). Thereafter, the updated OCR document sheet indicated by the updated document sheet format data unwound in a bit map is printed by the function of the recording unit 41 (a step S155). When the printing operation of the updated OCR document sheet is finished (a step S156), the procedure returns to the step S150 to stand by another printing operation.

Accordingly, because the OCR document sheet is printed at a terminal side, the transmitter can easily obtain the OCR document sheet.

Also, when the format of the OCR document sheet is modified or a new type of OCR document sheet is required, an modified or new format of the OCR document sheet is down-loaded to the facsimile apparatus 12, the updated OCR document sheet can be always used at each of the apparatuses 12. Also, any trouble resulting from the use of an old type OCR document sheet can be avoided.

Also, when the OCR sheet format information and the print format information are transmitted from the center apparatus 13 to the facsimile apparatus 12, the updated OCR document sheet is immediately printed at each of terminal sides. Therefore, the updated OCR document sheet can be always used.

Also, even though a plurality types of OCR document sheets are required to be updated, because a plurality of formats of the OCR document sheets are down-loaded to the facsimile apparatus 12, the OCR document sheets can be easily updated.

Next, an order operation performed in the center apparatus 13 is described with reference to FIGS. 14 and 15.

When the contents of the order indicated by the corrected character recognized data (or the code data) and the bit data are transmitted from the facsimile apparatus 12 to the center apparatus 13 in the steps S129 to S140, an order operation is performed in the center apparatus 13, and the reception of the order contents is facsimile-transmitted to the facsimile apparatus 12 to inform the facsimile apparatus 12 of the reception.

Figure 14:
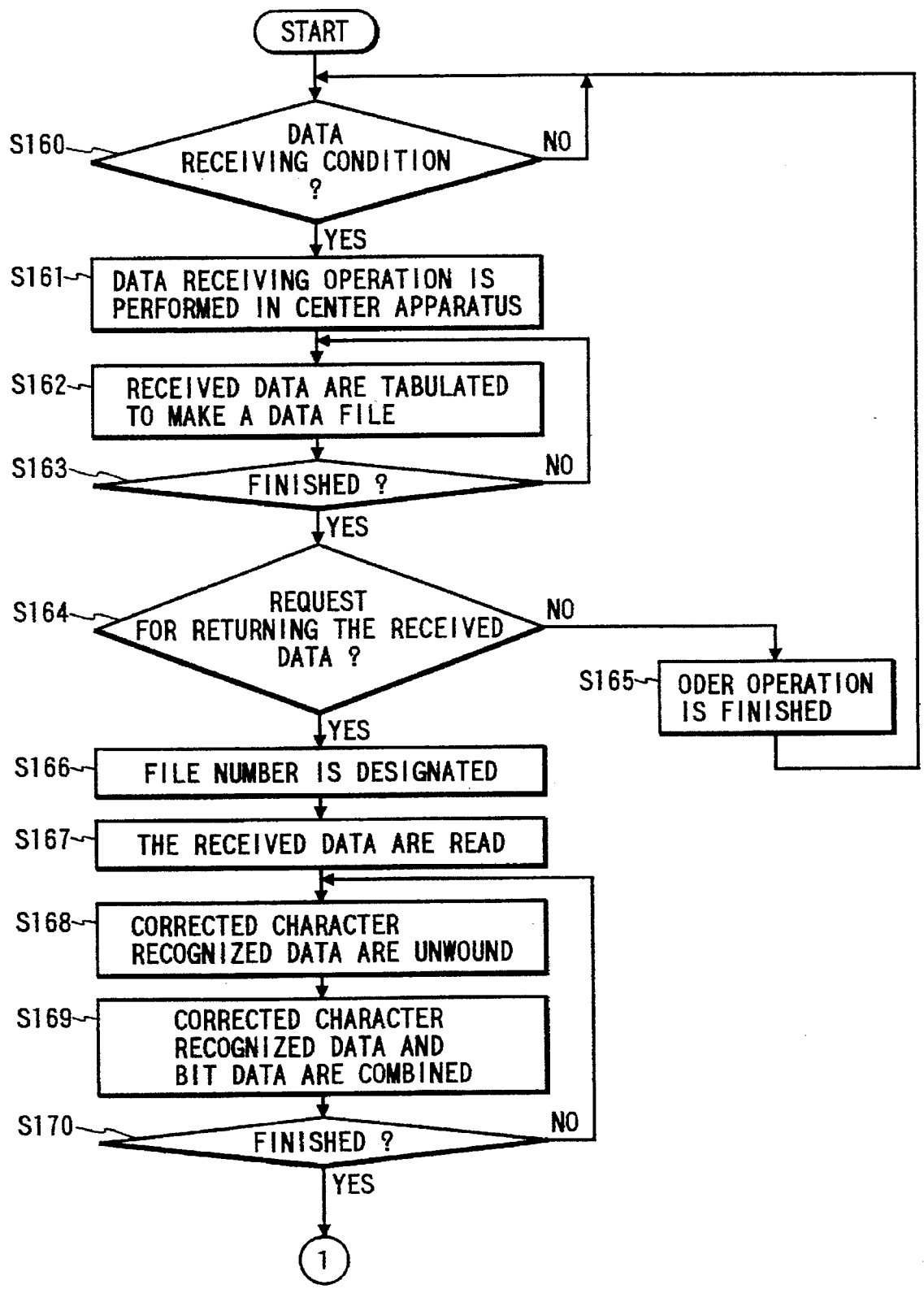
FIGS. 14 and 15 are a flow chart showing the procedure for sending back the character recognizing data from the OCR center apparatus to the OCR-FAX apparatus.

In detail, as shown in FIG. 14, when the center apparatus 13 is set in a data receiving condition (a step S160), a data receiving operation is performed in the center apparatus 13 to receive the corrected character recognized data belonging to the code data and the bit data transmitted from the facsimile apparatus 12 (a step S161). Pieces of received data representing the corrected character recognized data and the bit data are stored in a data memory. Thereafter, the number of ordered commodities, the number of returned commodities, the amount of money corresponding to the ordered commodities and the amount of money corresponding to the returned commodities are counted for each type of commodity in the center apparatus 13 and are tabulated to make a data file of the data received, and the data file is stored in the center apparatus 13 (a step S162). When the tabulating operation is finished (a step S163), it is checked in the center apparatus 13 whether or not the received data are required to be returned to the apparatus 12 (a step S164). When the received data are required not to be returned, the order operation performed in the center apparatus 13 is finished (a step S165).

In contrast, when the received data are required to be returned, a data returning operation is performed in the center apparatus 13 to inform the facsimile apparatus 12 of the data reception. That is, a file number of the data memory is designated by the transmitter (a step S166), and the received data (the corrected character recognized data and the bit data) stored in the data memory are read out (a step S167). Thereafter, the corrected character recognized data are raster-converted in a character generating unit and are unwounded in a memory (a step S168). Thereafter, the bit data indicating the signature of a transmitter is unwounded in the memory, the corrected character recognized data unwound and the bit data unwound are combined (a step S169) to form a piece of combined data, and the formation of the combined data unwound is finished (a step S170).

Figures 15, 16:
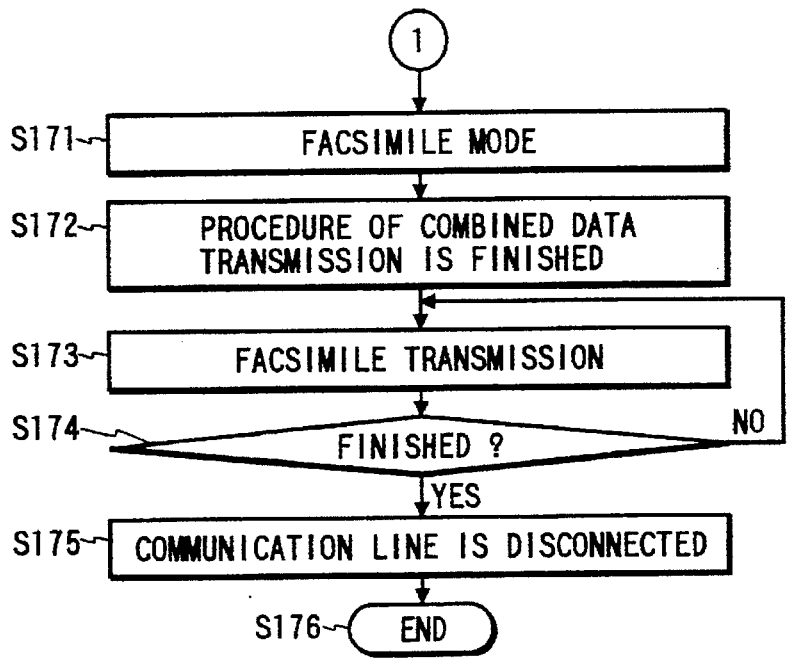
FIG. 16 is an example of the character recognizing data which are sent back to the OCR-FAX apparatus and are displayed with the character patterns, bit data and font data.

Thereafter, as shown in FIG. 15, a facsimile transmitting unit of the center apparatus 13 is operated to set the apparatus in a facsimile mode, and the transmission of the combined data to the facsimile apparatus 12 is started (a step S171). The procedure of the combined data transmission is as follows. The facsimile apparatus 12 is initially call up by the center apparatus 13, the center apparatus 13 is connected with the facsimile apparatus 12 through a communication line 14, and the procedure of the combined data transmission is finished (a step S172). Thereafter, a facsimile transmission of the combined data is started (a step S173). When the facsimile transmission is finished (a step S174), the communication line 14 is disconnected (a step S175), and the facsimile transmission of the combined data is finished (a step S176).

Therefore, the contents of the order are returned to the facsimile apparatus 12, and the contents of the order returned and the character patterns are displayed on the display 38, as shown in FIG. 16.

Accordingly, because the contents of the order are returned to the facsimile apparatus 12, the transmitter can easily confirm whether the contents of the order are correctly transmitted to the center apparatus 13.

A second embodiment of a facsimile apparatus and a communication system according to the present invention is described with reference to FIGS. 17 to 27 to solve the second object.

Figure 17:
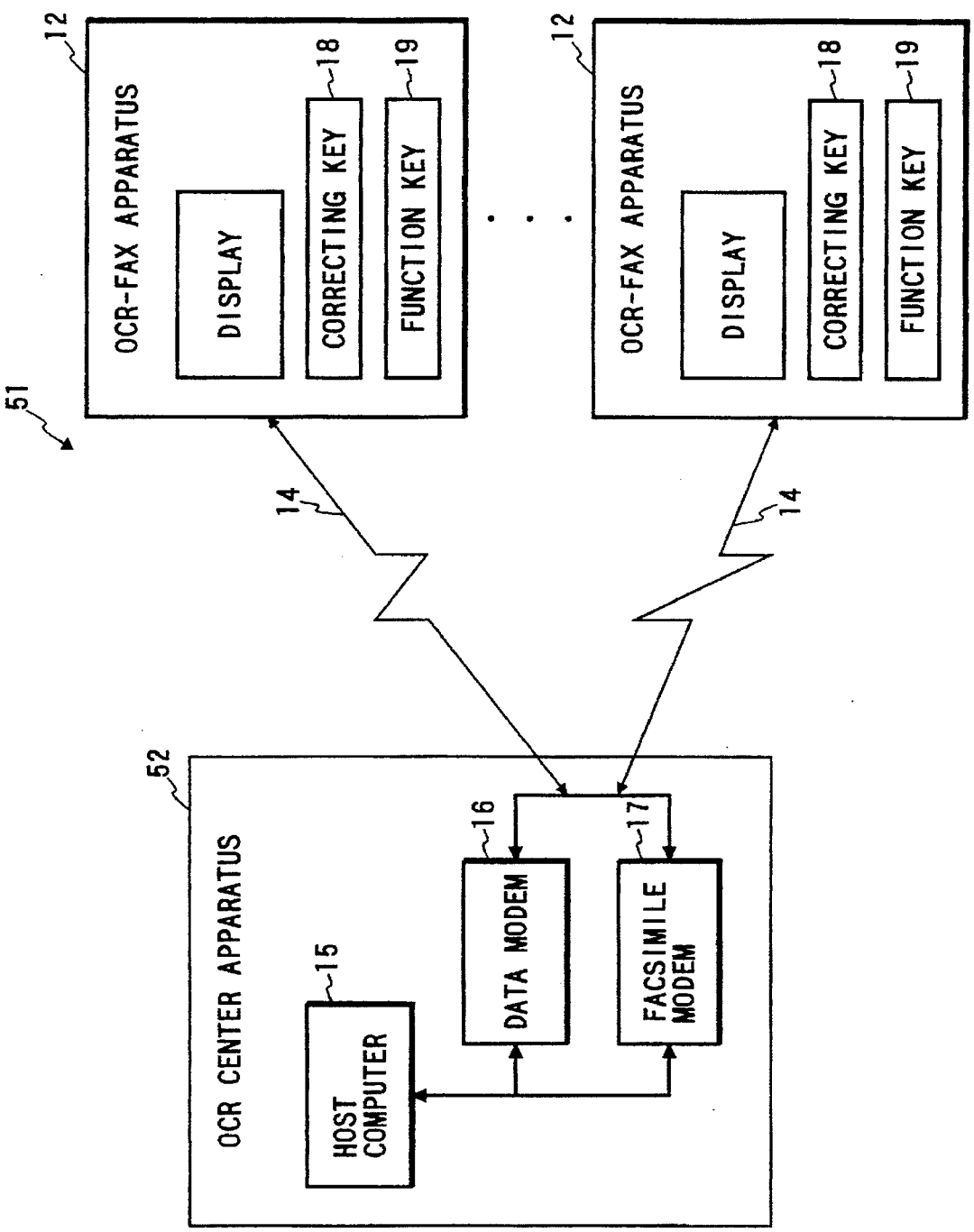
FIG. 17 is a block diagram of a communication system according to a second embodiment of the present invention.

FIG. 17 is a block diagram of a communication system according to a second embodiment of the present invention.

As shown in FIG. 17, a communication system 51 comprises a plurality of optical character recognition (OCR)-facsimile (FAX) apparatuses 52 placed at a plurality of order terminal sides, and the OCR center apparatus 13. Each of the OCR-FAX apparatuses 52 has the OCR function, the facsimile communication function and the data communication function in the same manner as the OCR-FAX apparatus 12. Also, each of the OCR-FAX apparatuses 52 is provided with the display 38, the correcting key and the function key placed in the operating unit 22 in the same manner as the OCR-FAX apparatus 12.

Figure 18:
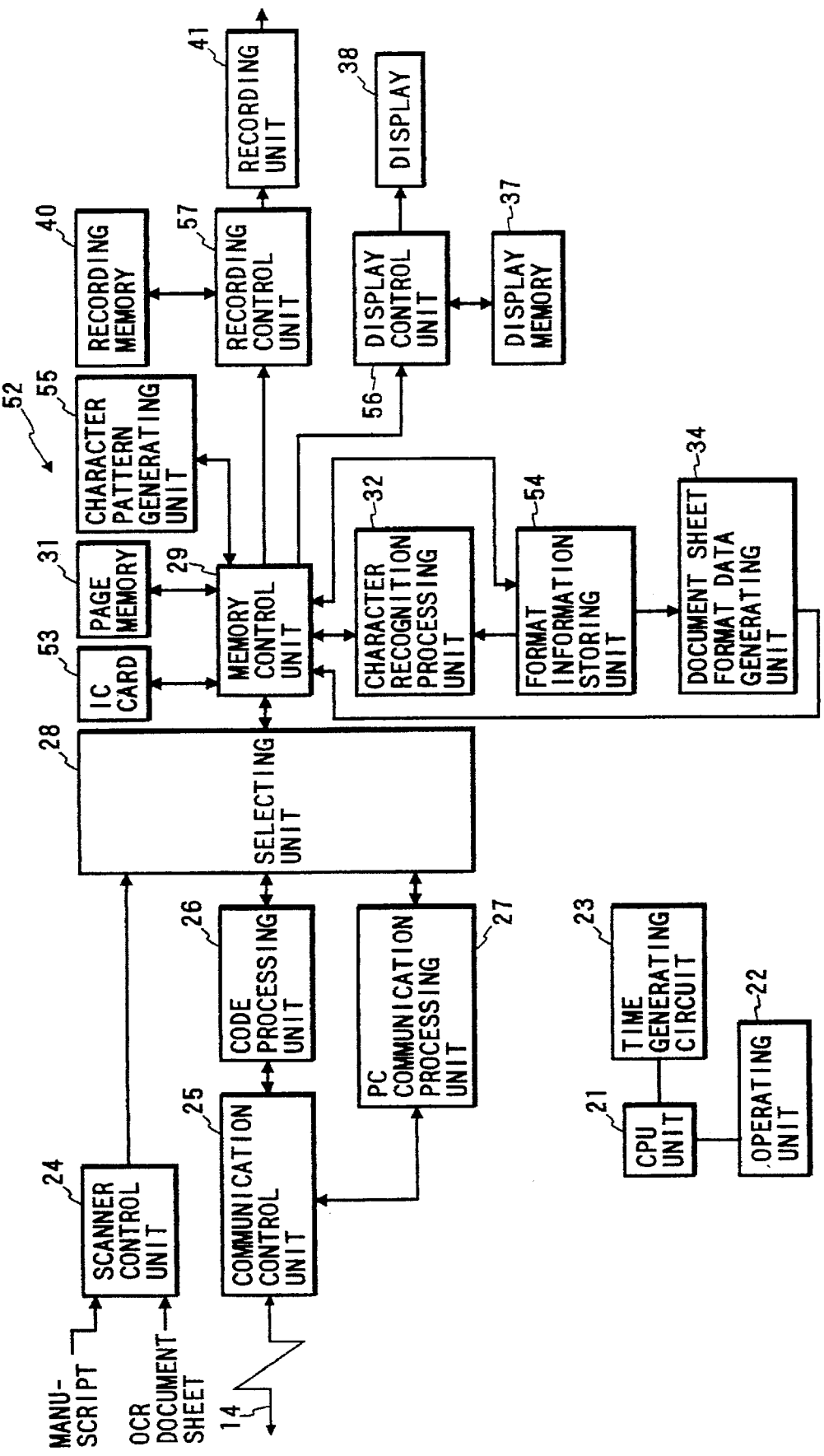
FIG. 18 is a block diagram showing the configuration of each of OCR-FAX apparatuses shown in FIG. 17.

FIG. 18 is a block diagram showing the configuration of each of the OCR-FAX apparatuses 52.

As shown in FIG. 18, the facsimile apparatus 52 comprises the central processing unit (CPU) 21, the operating unit 22, the time generating circuit 23, the scanner control unit 24, the communication control unit 25, the code processing unit 26, the pulse-code (PC) communication processing unit 27, the selecting unit 28, the memory control unit 29, an integrated circuit (IC) card 53 for storing a plurality of OCR recognizing programs which each are composed of a basic program used for a plurality types of OCR document sheets in common and a subordinate program used for a type of OCR document sheet, the page memory 31, the character recognition processing unit 32, a format information storing unit 54 for storing a piece of OCR sheet format information of each of the OCR document sheets, a piece of display format information of each of the OCR document sheet, a piece of print format information of each of the OCR document sheet and a code conversion table which are down-loaded by the center apparatus 13 and are transmitted through the PC communication processing unit 27 as the code data, the document sheet format data generating unit 34, a character pattern generating unit 55 for generating strains of converted characters corresponding to the character recognized data, a display control unit 56 for controlling the display of the character recognized data stored in the page memory 31 according to the OCR sheet format information stored in the format information storing unit the display memory 37, the display 38, a recording control unit 57 for controlling the print of the character recognized data stored in the page memory 31 according to the OCR sheet format information stored in the format information storing unit 54, the record memory 40, and the recording unit 41.

The basic program is used to recognize the common format in the types of OCR document sheets, and each of the subordinate programs is used to recognize a peculiar format not common to the types of OCR documents. When a piece of OCR recognizing information composed of one OCR recognizing program and one OCR sheet format information is down-loaded from the OCR center apparatus 13 to the IC card 53 and format information storing unit 54 of the OCR-FAX apparatus 52, there are two types of operations. In one type of operation, the basic program and the subordinate program of the OCR recognizing program are down-loaded to the IC card 53 together. In the other type of operation, the basic program of the OCR recognizing program is stored in the IC card 53 in advance, and the subordinate program of the OCR recognizing program is down-loaded to the IC card 53. The IC card 53 is composed of a static random access memory (SRAM) portion and a nonvolatile flash memory (or an electrically erasable/programable read only memory) portion. Pieces of data stored in the SRAM portion of the IC card 53 disappear when an electric supply to the IC card 53 is cut off or the IC card 53 is pulled out from the facsimile apparatus 52, and pieces of data stored in the flash memory portion are maintained even though an electric supply to the IC card 53 is cut off. The OCR recognizing programs are stored in the flash memory of the IC card 53.

FIG. 19 shows an example of an OCR document sheet according to the second embodiment. In the second embodiment, the OCR document sheet used to order a commodity and a display image of a recognized result are described.

As shown in FIG. 19, an "order code" denotes a piece of code data for specifying an ordering person or company, and the ordering person or company writes the order code in an OCR document sheet. An "order date" indicates a transmitting date of the OCR document sheet in which contents of an order are recognized. A "commodity code" indicates a type of ordered commodity, and a "number or amount" placed at a right side of the commodity code indicates the number of ordered commodities. Numerals in the OCR document sheet are handwritten by a transmitter. The meaning of handwritten first numerals indicating the number of ordered commodities can be easily realized. In contrast, the meanings of handwritten second numerals indicating the order code, the commodity codes and the order date cannot be easily realized. In the second embodiment, the handwritten second numerals are displayed or printed out to be easily realized.

FIG. 20 shows an example of an optical character recognized result of the numerals displayed on the display 38.

As shown in FIG. 20, a strain of fixed characters (the "order code"), a piece of character recognized data ("12356") and a strain of converted characters (M electronic company, Megufo in Japan) obtained by converting the character recognized data "12356" are displayed in th display 38 as an item of the order code. A strain of fixed characters (the "order date"), a piece of character recognized data ("25") and a strain of converted characters ("October") obtained by converting the character recognized data "10" are displayed in the display 38 as an item of order date. A strain of fixed characters ("commodity codes", "commodity names" and "the number of ordered commodities"), pieces of character recognized data (commodity codes "0101", - - - ,"2801", and number or quantity codes "5", - - - ,"14") and strains of converted characters ("television", "radio", "battery", "electronic oven" and "stereo") obtained by converting the character recognized data ("0101", - - - ,"2801") are displayed in the display 38 as pieces of ordered data. The strains of fixed characters are stored in the format information storing unit 54 in advance, and the strains of converted characters are generated in the character pattern generating unit 55. Also, the character recognized data are easily distinguished from the strains of fixed characters and the strains of converted characters by adding an identifying symbol "[]" to each of the character recognized data. The identifying symbol "[]" are generated by the character pattern generating unit 55.

Therefore, because not only the character recognized data of the handwritten numerals but also the strains of fixed characters (or headings) and the strains of converted characters are displayed with the handwritten numerals, the transmitter can promptly realize the meaning of the character recognized data displayed in the display 38.

FIG. 21A shows a code conversion table (No.1) of the OCR sheet format information stored in the format information storing unit 54, FIG. 21B shows a code conversion table (No.2) of the OCR sheet format information stored in the format information storing unit 54.

In FIG. 21A, the order codes and names of ordering persons or companies are shown in one-to-one correspondence. When an order code handwritten in the OCR document sheet is recognized as "12356" in the character recognition processing unit 32, a strain of characters "M electronic company, Megro" is generated in the character pattern generating unit 55 according to the code conversion table shown in FIG. 21A, and the strain of characters is displayed in the display 38 or is printed out by the recording unit 41.

In FIG. 21B, the commodity codes and commodity names are are shown in one-to-one correspondence. When a commodity code handwritten in the OCR document sheet is recognized as "0101" in the character recognition processing unit 32, a strain of characters "television" is generated in the character pattern generating unit 55 according to the code conversion table shown in FIG. 21B, and the strain of characters is displayed in the display 38 or is printed out by the recording unit 41.

FIG. 22 shows an example of a piece of display format information of the OCR sheet format information stored in the format information storing unit 54.

As shown in FIG. 22, in a first format region for the strains of fixed characters, a display starting position, a displayed data type distinguishing code and an offset of a strain of fixed characters are stored for each of the strains. The display starting position of a strain of fixed characters indicates a heading coordinates of the strain displayed in the display 38. The displayed data type distinguishing code indicates whether the character recognized data are displayed in the display 38 or pieces of returned data produced from the character recognized data in the center apparatus 13 are displayed in the display 38. The offset of a strain of fixed characters indicates a position of the strain stored in the format information storing unit 54.

In a second format region for the character recognized data or the returned data, a display starting position, a displayed data type distinguishing code and an offset are stored for each of the character recognized data in the same manner as in the first format region. In addition, the identifying symbol "[]" and a piece of conversion information indicating whether or not a strain of converted characters obtained by converting a piece of character recognized data exists are stored for each of the character recognized data. In the second format region for the date code and the number or quantity codes, the conversion information indicates no existence of a strain of converted characters. In contrast, in the second format region for the order code and the commodity codes, the conversion information indicates the existence of a strain of converted characters. In case where the conversion information indicates the existence of a converted character, a piece of specifying information for specifying a code conversion table shown in FIG. 21A or FIG. 21B and a display starting position of a strain of converted characters are added.

Therefore, because a format of the character recognized data converted into a strain of converted characters and another format of the character recognized data not converted are stored in the same second format region and because the formats are distinguished from each other according to only the conversion information to determine whether a strain of converted characters is to be generated, the display format information can be easily prepared.

The display format information prepared in the center apparatus 13 is down-loaded to the IC card 53, and the display format information stored in the IC card 53 is transferred to the format information storing unit 54.

Figure 23:
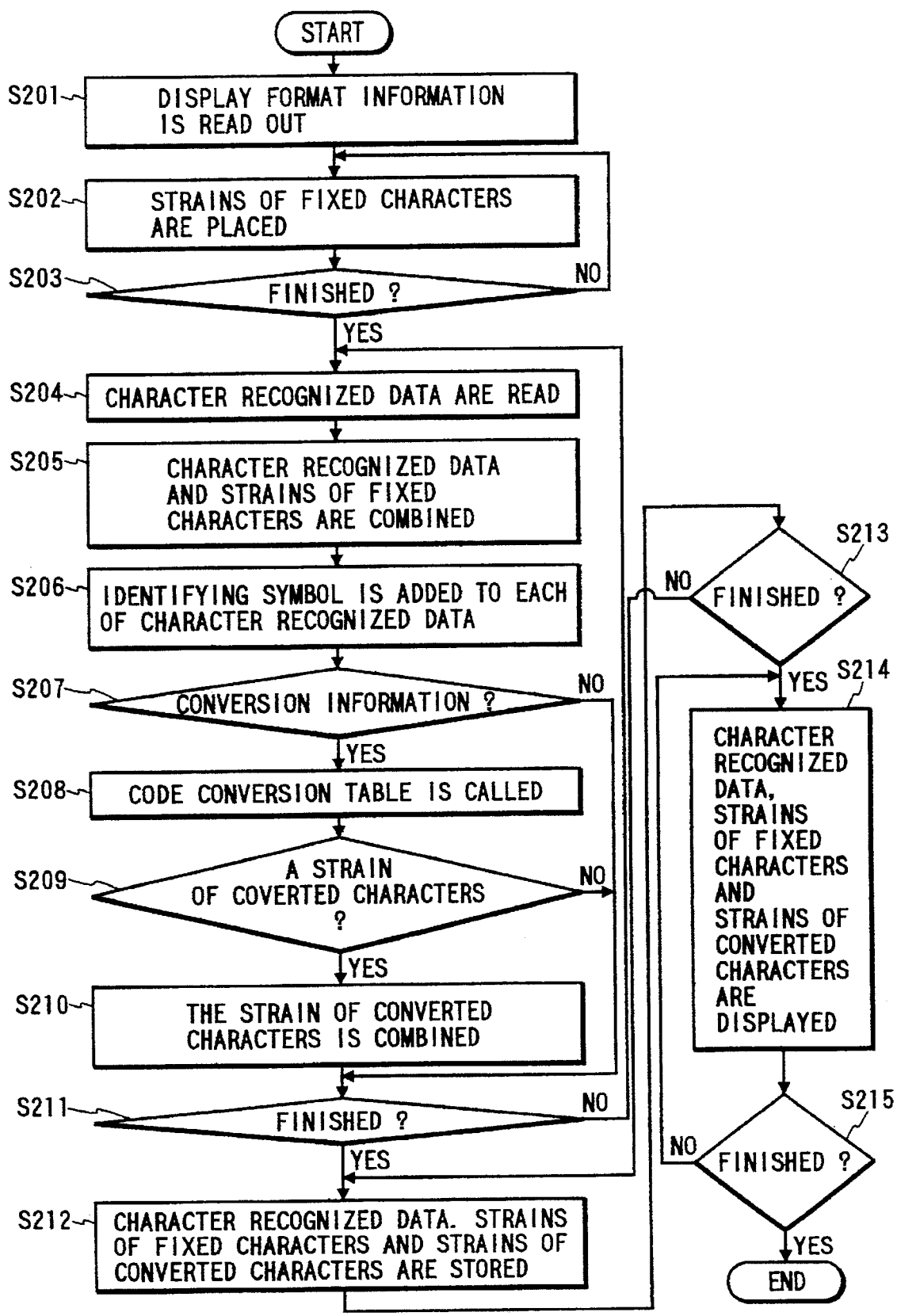
FIG. 23 is a flow chart showing a displaying operation for displaying the character recognized data, strains of fixed characters and strains of converted characters in the display.

Next, a displaying operation for displaying the character recognized data and strains of converted characters in the display 38 is described with reference to FIG. 23.

Contents of an order written in a type of OCR document sheet are read in the scanner controlling unit 24 and are stored in the page memory 31 as pieces of character recognized data in the same manner as in the first embodiment. Thereafter, as shown in FIG. 23, a piece of display format information corresponding to the type of OCR document sheet is read out from the format information storing unit 54 to the page memory 31 under the control of the memory control unit 29 (a step S201), and a plurality of strains of fixed characters stored in particular areas of the format information storing unit 54 in advance are placed in particular areas of the page memory 31 one after another according to the display format information (a step S202). When all of the strains of fixed characters are placed in the page memory 31 (a step S203), the character recognized data stored in an area of the page memory 31 are read out under the control of the memory control unit 29 (a step S204) and are placed in prescribed areas of the page memory 31 according to the display format information to be combined with the strains of fixed characters (a step S205). Also, the identifying symbol "[]" is added at each of the character recognized data (a step S206). Thereafter, it is judged by the memory control unit 29 whether or not a piece of conversion information indicates the existence of a strain of converted characters in the second format region of the display format information (a step S207). When the conversion information indicates the existence of a strain of converted characters, the code conversion table stored in the format information storing unit 54 is called under the control of the memory control unit 29 (a step S208). Thereafter, when a strain of converted characters corresponding to a piece of character recognized data exists, the strain of converted characters is generated in the character pattern generating unit 55 according to the code conversion table (a step S209), and the strain of converted characters is combined with a strain of fixed characters or a piece of character recognized data in the page memory 31 (a step S210). When all of strains of converted characters and all of the character recognized data are combined with the strains of fixed characters (a step S211), the character recognized data are stored in the display memory 37 to make a layout of the character recognized data agreeing with that of the contents of the order handwritten in the OCR document sheet, and the strains of converted characters and the strains of fixed characters are stored in the display memory 37 to make a connection with the character recognized data (steps S212, S213). Thereafter, the strains of converted characters, the character recognized data and the strains of fixed characters are displayed (steps S214, S215).

Next, a printing operation for printing out the character recognized data and strains of converted characters in the recording unit 41 is described with reference to FIG. 24.

Figure 24:
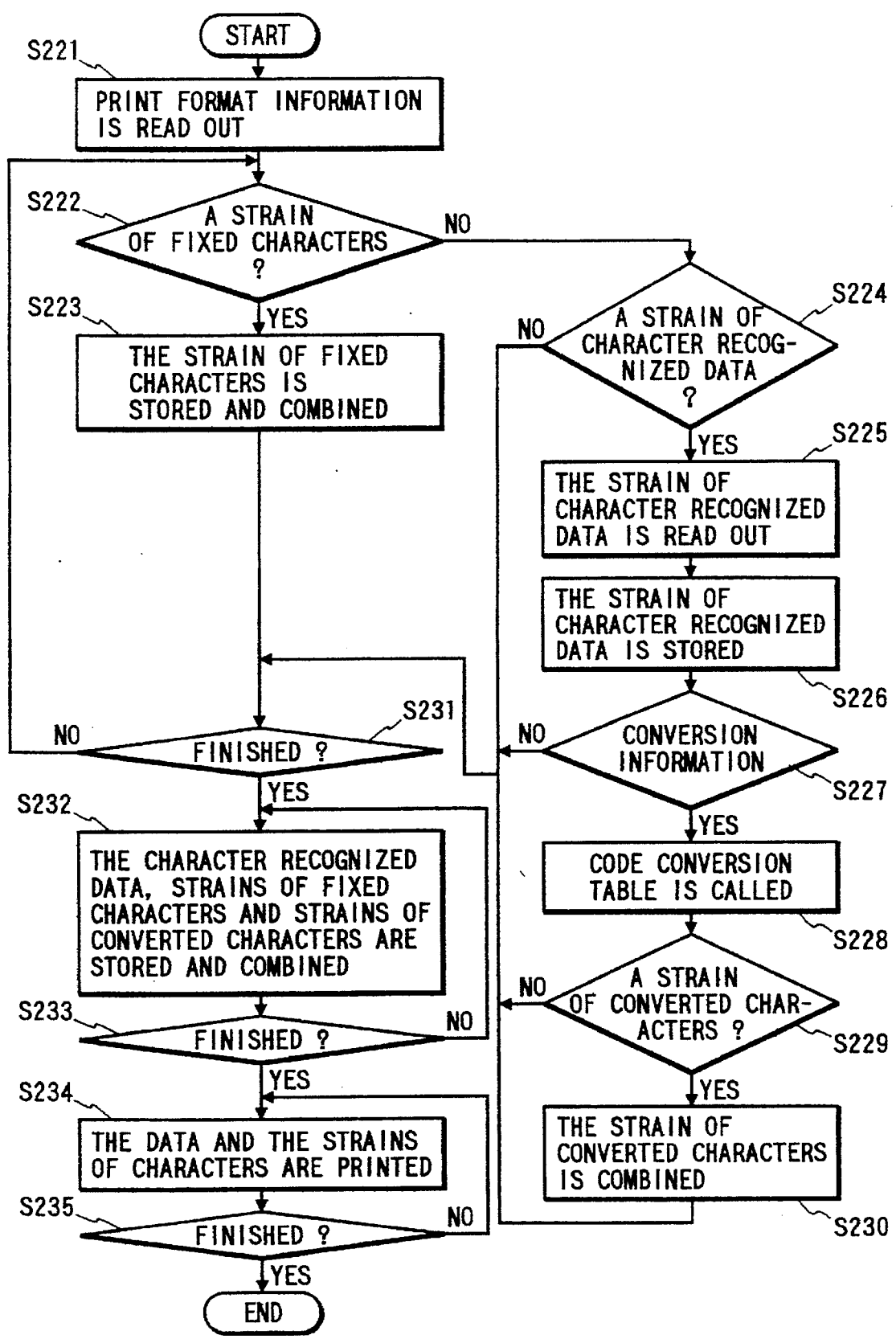
FIG. 24 is a flow chart showing a printing operation for printing out the character recognized data, strains of fixed characters and strains of converted characters in a recording element shown in FIG. 18.

As shown in FIG. 24, a piece of print format information corresponding to a type of OCR document sheet is read out from the format information storing unit 54 to the page memory 31 in the same manner as in the displaying operation (a step S221), and it is judged in the memory control unit 29 whether or not a format for a strain of fixed characters not stored in the page memory 31 is registered in the print format information (a step S222). When a format for a strain of fixed characters not stored in the page memory 31 is registered, the strain of fixed characters stored in the format information storing unit 54 in advance is stored in the page memory 31 to be combined with the character recognized data (a step S223). When all of the strains of fixed characters of which the formats are registered in the print format information are stored in the page memory 31 in the step S222, the procedure proceeds to a step S224. In the step S224, it is judged in the memory control unit 29 whether or not a format for a piece of character recognized data not stored in the page memory 31 is registered in the print format information. When a format for a piece of character recognized data not stored in the page memory 31 is registered, the character recognized data is read out from the page memory 31 (a step S225) and is placed in prescribed areas of the page memory 31 according to the print format information to be combined with a strain of fixed characters (a step S226). Thereafter, it is judged according to the print format information whether or not a piece of conversion information corresponding to the character recognized data indicates the existence of a strain of converted characters (a step S227). When the conversion information indicates the existence of a strain of converted characters, the code conversion table stored in the format information storing unit 54 is called (a step S228), and it is judged whether or not a strain of converted characters corresponding to the character recognized data is registered in the code conversion table (a step S229). When a strain of converted characters corresponding to the character recognized data is registered in the code conversion table, the strain of converted characters is generated in the character pattern generating unit 55 according to the code conversion table, and the strain of converted characters is combined with a strain of fixed characters in the page memory 31 (a step S230). When all of the character recognized data of which the formats are registered in the print format information are stored in the page memory 31 in the step S224, the combination of the strains of fixed characters, the character recognized data and the strains of converted characters are finished (a step S231). Thereafter, the character recognized data are stored in the recording memory 40 to make a layout of the character recognized data agreeing with that of the contents of the order handwritten in the OCR document sheet, and the strains of converted characters and the strains of fixed characters are stored in the recording memory 40 to make a connection with the character recognized data (steps S232, S233). Thereafter, the strains of converted characters, the character recognized data and the strains of fixed characters are printed (steps S234, S235).

Next, a displaying operation of pieces of returned data which are transmitted from the center apparatus 13 after the character recognized data are transmitted from the page memory 31 to the center apparatus 13 through the PC communication processing unit 27 and the communication control unit 25 is described.

Figure 25:
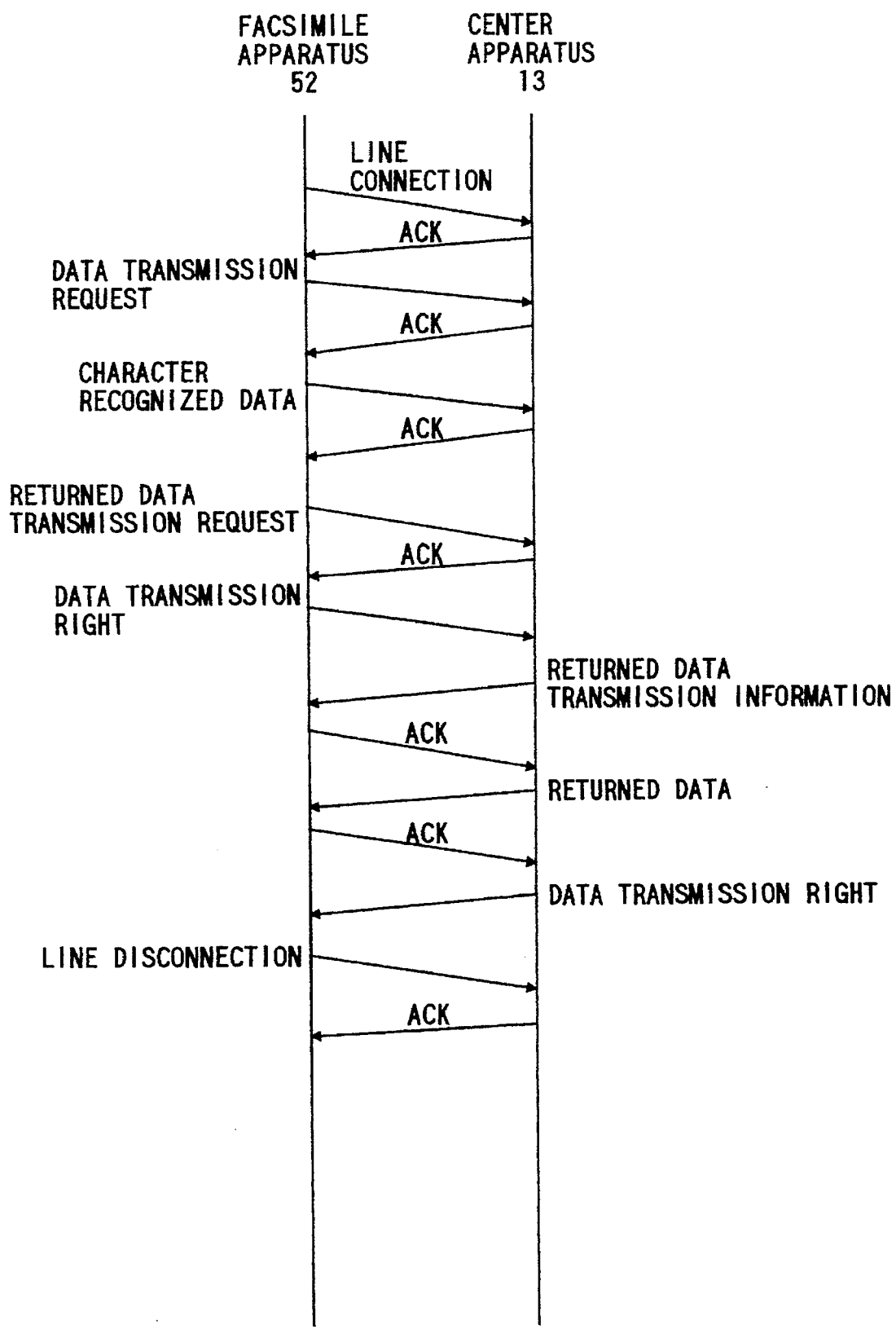
FIG. 25 shows the procedure for transmitting the character recognized data to a center apparatus and requesting the center apparatus to transmit pieces of returned data to the facsimile apparatus.

FIG. 25 shows the procedure for transmitting the character recognized data to the center apparatus 12 and requesting the center apparatus 13 to transmit pieces of returned data to the facsimile apparatus 52.

As shown in FIG. 25, a line between the center apparatus 13 and a particular facsimile apparatus 52 is initially connected by the facsimile apparatus 52. When an acknowledge (ACK) signal is sent from the center apparatus 13 to the facsimile apparatus 52, a character recognized data transmission request is sent from the facsimile apparatus 52 to the center apparatus 13, and an acknowledge (ACK) signal is sent from the center apparatus 13 to the facsimile apparatus 52. Thereafter, the character recognized data are transmitted from the facsimile apparatus 52 to the center apparatus 13, and an acknowledge (ACK) signal informing that the character recognized data are received in the center apparatus 13 is sent from the center apparatus 13 to the facsimile apparatus 52. Thereafter, a returned data transmission request is sent from the facsimile apparatus 52 to the center apparatus 13, and an acknowledge (ACK) signal is sent from the center apparatus 13 to the facsimile apparatus 52. Thereafter, a data transmission right is transferred to the center apparatus 13, a piece of transmission information of pieces of returned data is transferred from the center apparatus 13 to the facsimile apparatus 52, and an acknowledge (ACK) signal is sent from the facsimile apparatus 52 to the center apparatus 13. Thereafter, pieces of returned data produced from the character recognized data in the center apparatus 13 are transmitted to the facsimile apparatus 52, an acknowledge (ACK) signal informing that the returned data are received in the facsimile apparatus 52 is sent from the facsimile apparatus 52 to the center apparatus 13. Therefore, the data transmission right is sent back to the facsimile apparatus 52, the line between the center apparatus 13 and a particular facsimile apparatus 52 is disconnected by the facsimile apparatus 52, and an acknowledge (ACK) signal is sent from the center apparatus 13 to the facsimile apparatus 52.

FIG. 26 shows an example of the returned data displayed in the display 38.

An image of the returned data is divided into two types of images, and the images are alternately displayed in the display 38 by operating the function key 19 of the operating unit 22. A first part of the returned data is composed of the character recognized data, the strains of fixed characters and the strains of converted characters transmitted to the center apparatus 13 and are displayed as a first image. Therefore, the image is the same as that shown in FIG. 20. Also, a second part of the returned data is composed of total numbers of ordered commodities, the amount of money for the ordered commodities and a delivered date and is displayed as a second image.

Therefore, the ordering person or company (or the transmitter) can alternately watch actually ordered contents composed the name of the ordering person or company, the order date, the commodity names and the number of ordered commodities and pieces of processed data composed of the sum of ordered commodities, the amount of money for the ordered commodities and a delivered date by operating the function key 19. Accordingly, the ordering of the ordering person or company can be reliably confirmed.

FIG. 27 shows an example of a combined image which is formed by the character recognized data and the returned data and is printed out in the recording unit 41.

As shown in FIG. 27, the contents of an order reproduced by the character recognized data, the strains of fixed characters and the strains of converted characters are printed out in an upper portion of a recording sheet, and the returned data are printed out in a lower portion of the recording sheet.

Therefore, the ordering person or company (or the transmitter) can alternately watch the contents of the order and the returned data, and the ordering of the ordering person or company can be reliably confirmed.

Accordingly, because the character recognized data are displayed or printed with the strains of fixed characters and the strains of converted characters at each of the order terminal sides, the meaning of the character recognized data can be easily recognized, and the contents of the order can be easily checked by the transmitter.

Also, because the character recognized data displayed or printed are emphasized by adding the identifying symbol "[]", the transmitter can easily check whether or not the contents of the order are correctly recognized at each of the order terminal sides.

Also, because the OCR document sheet is printed at each of the order terminal sides, the transmitter can easily obtain the OCR document sheet.

Also, when the format of the OCR document sheet is modified or a new type of OCR document sheet is required, an modified or new format of the OCR document sheet is down-loaded to the facsimile apparatus 52, the updated OCR document sheet can be always used at each of the order terminal sides. Also, any trouble resulting from the use of an old type OCR document sheet can be avoided at each of the order terminal sides.

Also, when the OCR sheet format information and the print format information are transmitted from the center apparatus 13 to the facsimile apparatus 52, the updated OCR document sheet is immediately printed at each of order terminal sides. Therefore, the updated OCR document sheet can be always used.

Also, even though a plurality types of OCR document sheets are required to be updated, because a plurality of formats of the OCR document sheets are down-loaded to the facsimile apparatus 52, the OCR document sheets can be easily updated.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A facsimile apparatus comprising:

program storing means for storing an OCR document sheet recognizing program used to recognize contents written in an OCR document sheet;

format information storing means for storing a piece of display format information used to display the contents of the OCR document sheet recognized according to the OCR document sheet recognizing program;

reading means for reading contents written in the OCR document sheet and obtaining one or more pieces of image data from the contents;

character recognizing means for recognizing the image data obtained in the reading means according to the OCR document sheet recognizing program stored in the program storing mean to convert the image data into pieces of character recognized data;

character pattern generating means for generating a character pattern which supports the realization of the character recognized data obtained in the character recognizing means;

displaying means for displaying the character recognized data obtained in the character recognizing means and the character pattern generated by the character pattern generating means according to the display format information stored in the format information storing means to check whether or not the contents written in the OCR document sheet are correct while referring the character pattern; and data transmitting means for transmitting the character recognized data obtained in the character recognizing means to an order-receiving center in cases where it is checked in the displaying means that the contents are correct.

2. A facsimile apparatus according to claim 1, further comprising:

printing means for printing out the OCR document sheet, in which any content is not written, according to a piece of OCR sheet format information stored in the format information storing means, the contents of the order being written in the OCR document sheet by a transmitter, and the contents of the order being read by the reading means.

3. A facsimile apparatus according to claim 1, further comprising:

inputting means for inputting pieces of correcting data to correct the character recognized data obtained in the character recognizing means while referring the character recognized data and the character pattern displayed by the displaying means, the character recognized data corrected being transmitted to the order-receiving center by the data transmitting means.

4. A facsimile apparatus according to claim 1 in which a transmitter signature written in the OCR document sheet is read by the reading means and is converted into a piece of bit data in the character recognizing means, and the bit data is transmitted to the order-receiving center with the character recognized data.

5. A facsimile apparatus according to the claim 1, further comprising:

printing means for printing out the character recognized data obtained in the character recognizing means and the character pattern generated by the character pattern generating means according to a piece of print format information stored in the format information storing means.

6. A facsimile apparatus according to claim 1 in which a piece of OCR sheet specifying information is stored in the program storing means, and a type of the OCR document sheet is specified in the character recognizing means according to the OCR sheet specifying information.

7. A facsimile apparatus comprising:

program storing means for storing an OCR document sheet recognizing program used to recognize contents written in an OCR document sheet;

format information storing means for storing a piece of print format information used to print the contents of the OCR document sheet recognized according to the OCR document sheet recognizing program;

reading means for reading contents written in the OCR document sheet and obtaining one or more pieces of image data from the contents;

character recognizing means for recognizing the image data obtained in the reading means according to the OCR document sheet recognizing program stored in the program storing means to convert the image data into pieces of character recognized data;

character pattern generating means for generating a character pattern which supports the realization of the character recognized data obtained in the character recognizing means;

printing means for printing out the character recognized data recognized by the character recognizing means and the character pattern generated by the character pattern generating means according to the print format information stored in the format information storing means to check whether or not the contents written in the OCR document sheet are correct while referring the character pattern; and data transmitting means for transmitting the character recognized data recognized by the character recognizing means to an order-receiving center in cases where it is checked in the printing means that the contents are correct.

8. A facsimile apparatus according to the claim 7, further comprising:

time generating means for generating a transmitted time of the character recognized data transmitted by the data transmitting means, the transmitted time being printed out by the printing means with the character recognized data and the character pattern.

9. A facsimile apparatus according to claim 7 in which the OCR document sheet of which the contents is read by the reading means is prepared by the printing means by printing out the OCR document sheet, in which any content is not written, according to a piece of OCR sheet format information stored in the format information storing means.

10. A facsimile apparatus according to claim 7 in which a piece of OCR sheet specifying information is stored in the program storing means, and a type of the OCR document sheet is specified in the character recognizing means according to the OCR sheet specifying information.

11. A communication system comprising:

an OCR center apparatus;

a plurality of facsimile apparatuses for respectively communicating with the OCR center apparatus; and a plurality of communication lines for respectively connecting the OCR center apparatus and one of the facsimile apparatuses, each of the facsimile apparatuses comprising program storing means for storing an OCR document sheet recognizing program and a piece of OCR sheet specifying information, the OCR document sheet recognizing program being utilized to recognize a piece of image data as a character, and the OCR sheet specifying information being utilized to specify a type of the OCR document sheet, reading means for reading contents of an order written in an OCR document sheet and obtaining pieces of image data from the contents of the order, character recognizing means for recognizing the image data obtained in the reading means according to the OCR document sheet recognizing program and the OCR sheet specifying information stored in the program storing means to convert the image data into pieces of character recognized data, character pattern generating means for generating a character pattern which supports the realization of the character recognized data obtained in the character recognizing means, and data transmitting means for transmitting the character recognized data obtained in the character recognizing means to the OCR center apparatus to inform the OCR center apparatus of the contents of the order, and the OCR center apparatus comprising information generating and transmitting means for generating a piece of modified OCR sheet specifying information utilized to specify a type of the OCR document sheet and transmitting the modified OCR sheet specifying information to each of the facsimile apparatuses to replace the OCR sheet specifying information stored in the program storing means with the modified OCR sheet specifying information.

12. A communication system according to claim 11, each of the facsimile apparatuses further comprising:

format information storing means for storing a piece of display format information used to display the contents of the OCR document sheet recognized according to the OCR document sheet recognizing program; and displaying means for displaying the character recognized data obtained in the character recognizing means and the character pattern generated by the character pattern generating means according to the display format information stored in the format information storing means to check whether or not the contents written in the OCR document sheet are correct while referring the character pattern, the character recognized data obtained in the character recognizing means being transmitted to the OCR center apparatus by the data transmitting means in cases where it is checked in the displaying means that the contents are correct.

13. A communication system according to claim 12, each of the facsimile apparatuses further comprising:

inputting means for inputting pieces of correcting data to correct the character recognized data obtained in the character recognizing means while referring the character recognized data and the character pattern displayed by the displaying means, the character recognized data corrected being transmitted to the OCR center apparatus by the data transmitting means.

14. A communication system according to claim 11, each of the facsimile apparatuses further comprising:

format information storing means for storing a piece of OCR sheet format information; and printing means for printing out the OCR document sheet, which any content is not written, according to the OCR sheet format information stored in the format information storing means, the contents of the order being written in the OCR document sheet by a transmitter, and the contents of the order being read by the reading means.

15. A communication system according to claim 11, each of the facsimile apparatuses further comprising:

format information storing means for storing a piece of print format information; and printing means for printing out the character recognized data obtained in the character recognizing means and the character pattern generated by the character pattern generating means according to the print format information stored in the format information storing means to check whether or not the contents of the order written in the OCR document sheet are correct while referring the character pattern, the character recognized data recognized by the character recognizing means being transmitted to the OCR center apparatus by the data transmitting means in cases where it is checked in the printing means that the contents or the order are correct.

16. A communication system according to the claim 15, in which each of the facsimile apparatuses further comprising:

time generating means for generating a transmitted time of the character recognized data transmitted by the data transmitting means, the transmitted time being printed out by the printing means with the character recognized data and the character pattern.

17. A communication system comprising:

an OCR center apparatus for modifying or newly producing a piece of display format information;

a plurality of facsimile apparatuses for respectively communicating with the OCR center apparatus; and a plurality of communication lines for respectively connecting the OCR center apparatus and one of the facsimile apparatuses, each of the facsimile apparatuses comprising format information storing means for storing the display format information transmitted from the OCR center apparatus through one of the communication lines, program storing means for storing an OCR document sheet recognizing program, the OCR document sheet recognizing program being utilized to recognize a piece of image data as a character, reading means for reading contents of an order written in the OCR document sheet and an identification mark of a transmitter written in the OCR document sheet, obtaining pieces of image data from the contents of the order, and obtaining a piece of identification data from the identification mark, character recognizing means for recognizing the image data and the identification data obtained in the reading means according to the OCR document sheet recognizing program stored in the program storing means to convert the image data into pieces of character recognized data and to convert the identification data into a piece of bit data, character pattern generating means for generating a character pattern which supports the realization of the character recognized data obtained in the character recognizing means, displaying means for displaying the character recognized data and the bit data obtained in the character recognizing means and the character pattern generated by the character pattern generating means according to the display format information stored in the format information storing means to check whether or not the contents of the order written in the OCR document sheet are correct while referring the character pattern; and data transmitting and receiving means for transmitting a piece of combined data obtained by combining the character recognized data and the bit data obtained in the character recognizing means to the OCR center apparatus in cases where it is checked in the displaying means that the contents are correct and receiving the combined data sent back from the OCR center apparatus, the combined data sent back being displayed by the displaying means to check whether or not the combined data is correctly transmitted to the OCR center apparatus.

18. A communication system according to the claim 17, in which each of the facsimile apparatuses further comprising:

printing means for printing out the combined data received in the data transmitting and receiving means and the character pattern generated by the character pattern generating means according to a piece of print format information stored in the format information storing means.

19. A communication system according to claim 17 in which a piece of OCR sheet specifying information is modified or newly produced in the OCR center apparatus and is transmitted to each of the facsimile apparatuses to be stored in the program storing means, and a type of the OCR document sheet is specified in the character recognizing means according to the OCR sheet specifying information.

20. A facsimile apparatus comprising:

reading means for reading ordering characters written in an OCR document sheet;

character recognizing means for recognizing the ordering characters read by the reading means to produce one or more pieces of character recognized data;

character supplying means for supplying one or more strains of fixed character predetermined and one or more strains of converted characters indicating meanings of the character recognized data produced by the character recognizing means;

displaying means for displaying the character recognized data produced by the character recognizing means and displaying the strains of fixed characters combined with the character recognized data and the strains of converted characters combined with the character recognized data to support the realization of the character recognized data and to check whether or not the character recognized data are correct; and transmitting means for transmitting the character recognized data produced by the character recognizing means to a center apparatus in cases where it is checked by the displacing means that the character recognized data are correct.

21. A facsimile apparatus according to claim 20, in which an identifying symbol is additionally supplied by the character supplying means to add the identifying symbol to each of the character recognized data.

22. A facsimile apparatus according to claim 20, in which the character supplying means comprises:

format information storing means for storing a code converting table, a piece of display format information and the strains of fixed characters down-loaded from the center apparatus, the character recognized data, the strains of fixed characters and the strains of converted characters being displayed by the displaying means according to the display format information; and character pattern generating means for generating the strains of converted characters according to the code converting table stored in the format information storing means.

23. A facsimile apparatus according to claim 20, in which the displaying means comprising:

displayed data controlling means for controlling an arrangement of the character recognized data to make a layout of the character recognized data agreeing with that of the ordering characters written in the OCR document sheet and controlling an arrangement of the strains of fixed characters and the strains of converted characters to be displayed in connection with the character recognized data; and a display for displaying the character recognized data, the strains of fixed characters and the strains of converted characters of which the arrangements are controlled by the displayed data controlling means.

24. A facsimile apparatus according to claim 20, further comprising:

printing means for printing out the character recognized data produced by th character recognizing means, the strains of fixed characters combined with the character recognized data and the strains of converted characters combined with the character recognized data.

25. A facsimile apparatus comprising:

reading means for reading ordering characters written in an OCR document sheet;

character recognizing means for recognizing the ordering characters read by the reading means to produce one or more pieces of character recognized data;

character supplying means for supplying one or more strains of fixed characters predetermined and one or more strains of converted characters indicating meanings of the character recognized data produced by the character recognizing means;

printing means for printing out the character recognized data produced by the character means and printing out the strains of fixed characters combined with the character recognized data and the strains of converted characters combined with the character recognized data to support the realization of the character recognized data and to check whether or not the character recognized data are correct; and transmitting means for transmitting the character recognized data produced by the character recognizing means to a center apparatus in cases where it is checked by the printing means that the character recognized data are correct.

26. A facsimile apparatus according to claim 25, in which an identifying symbol is additionally supplied by the character supplying means to add the identifying symbol to each of the character recognized data.

27. A facsimile apparatus according to claim 25, in which the character supplying means comprises:

format information storing means for storing a code converting table, a piece of print format information and the strains of fixed characters down-loaded from the center apparatus, the character recognized data, the strains of fixed characters and the strains of converted characters being printed by the printing means according to the print format information; and character pattern generating means for generating the strains of converted characters according to the code converting table stored in the format information storing means.

28. A facsimile apparatus according to claim 25, in which the printing means comprising:

printed data controlling means for controlling an arrangement of the character recognized data to make a layout of the character recognized data agreeing with that of the ordering characters written in the OCR document sheet and controlling an arrangement of the strains of fixed characters and the strains of converted characters to be printed in connection with the character recognized data; and a printer for printing out the character recognized data, the strains of fixed characters and the strains of converted characters of which the arrangements are controlled by the printed data controlling means.

* * * * *